(12) United States Patent
Nishi

(10) Patent No.: US 8,990,611 B2
(45) Date of Patent: Mar. 24, 2015

(54) COMMUNICATION SYSTEM AND GENERATING APPARATUS

(71) Applicant: Fujitsu Limited, Kawasaki-shi (JP)

(72) Inventor: Tetsuya Nishi, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 128 days.

(21) Appl. No.: 13/686,976

(22) Filed: Nov. 28, 2012

(65) Prior Publication Data

US 2013/0198570 A1 Aug. 1, 2013

(30) Foreign Application Priority Data

Jan. 31, 2012 (JP) ................................. 2012-019284

(51) Int. Cl.
*G06F 11/00* (2006.01)
*H04L 12/24* (2006.01)

(52) U.S. Cl.
CPC .......... *G06F 11/006* (2013.01); *H04L 41/0672* (2013.01); *H04L 41/12* (2013.01)
USPC .......................................... 714/4.1; 714/4.11

(58) Field of Classification Search
CPC .................................................... G06F 11/006
USPC ................... 714/4.1, 4.11, 4.12, 4.2, 4.21, 4.3
See application file for complete search history.

(56) References Cited

U.S. PATENT DOCUMENTS

| 6,557,112 | B1* | 4/2003 | Shimada ......................... 714/4.1 |
| 7,583,613 | B2* | 9/2009 | Klotz et al. .................... 370/252 |
| 8,179,806 | B2* | 5/2012 | Kobayashi et al. ............ 370/242 |
| 2004/0165526 | A1* | 8/2004 | Yada et al. ..................... 370/228 |
| 2007/0230346 | A1* | 10/2007 | Yamada et al. ................ 370/235 |

FOREIGN PATENT DOCUMENTS

JP 2009-55113 3/2009

* cited by examiner

*Primary Examiner* — Dieu-Minh Le
(74) *Attorney, Agent, or Firm* — Fujitsu Patent Center

(57) ABSTRACT

A communication system includes a switch that switches output ports according to an address of transmission data; a storing unit that stores a first set of addresses associated with the switch; a determining unit that determines, when a second set of addresses including in the transmission data a response to which is not received matches the first set of addresses in the storing unit, that there is a failure in the switch associated with the first set of addresses.

8 Claims, 14 Drawing Sheets

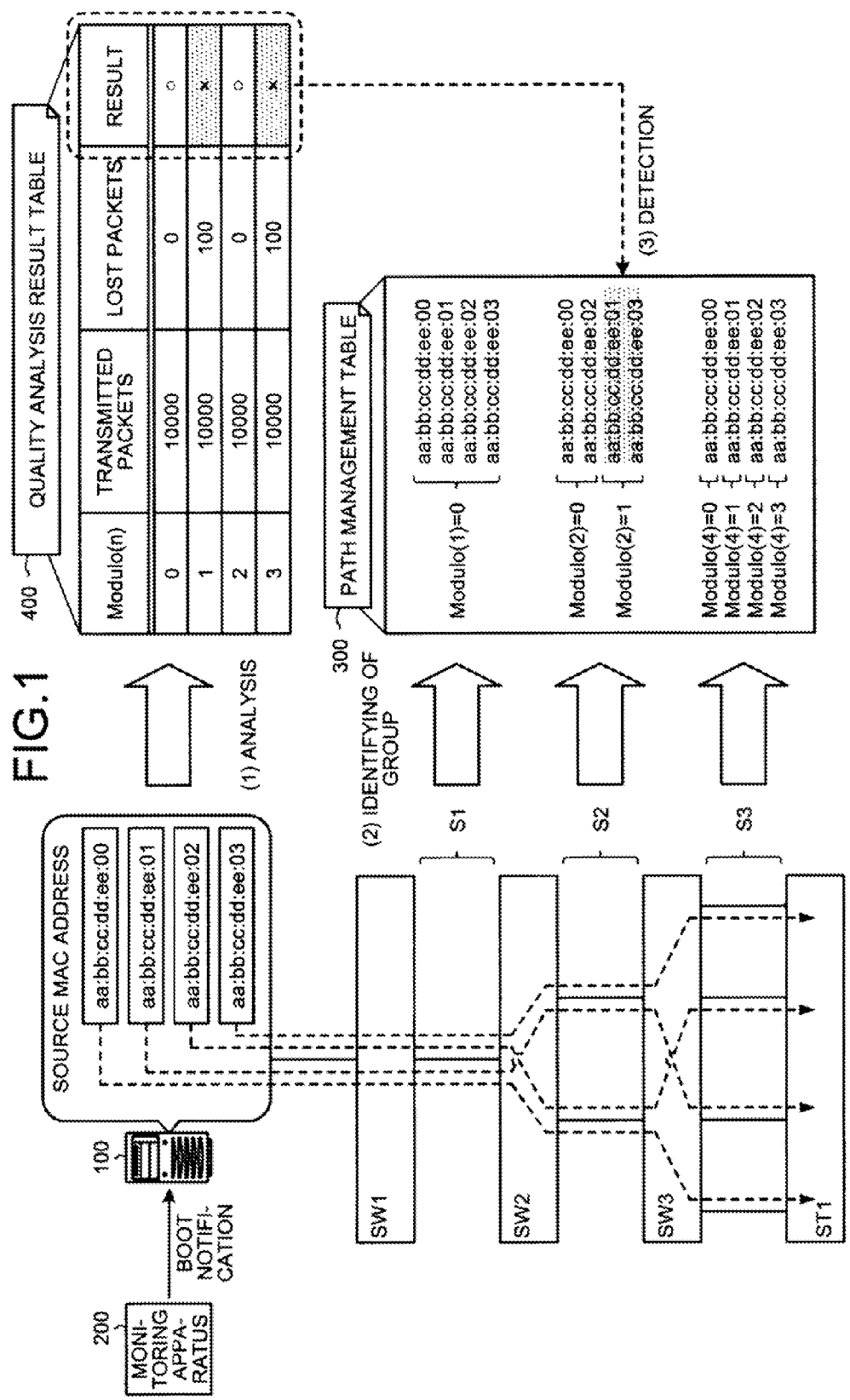

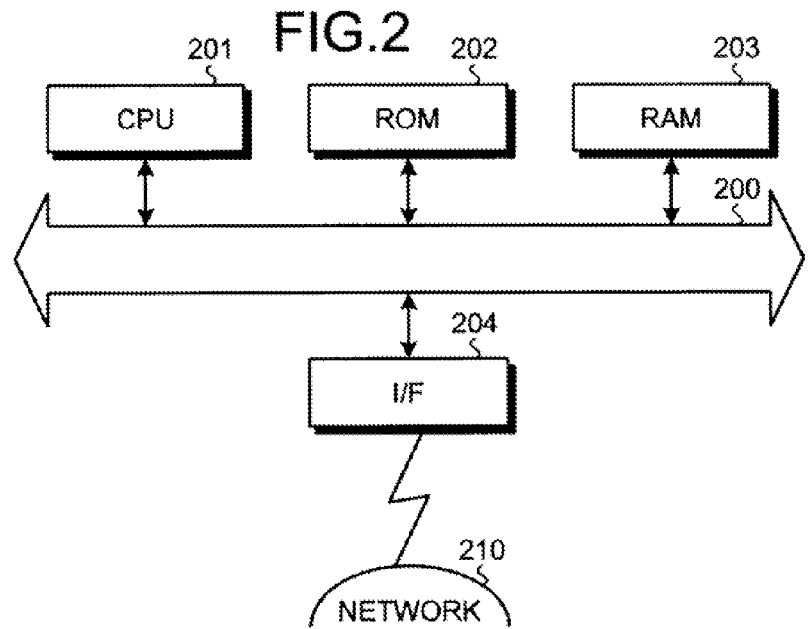

FIG.4
QUALITY ANALYSIS RESULT TABLE 400
| Modulo(n) | TRANSMITTED PACKETS | LOST PACKETS | RESULT |
|---|---|---|---|
| 0 | 10000 | 0 | ○ |
| 1 | 10000 | 100 | × |
| 2 | 10000 | 0 | ○ |
| 3 | 10000 | 100 | × |
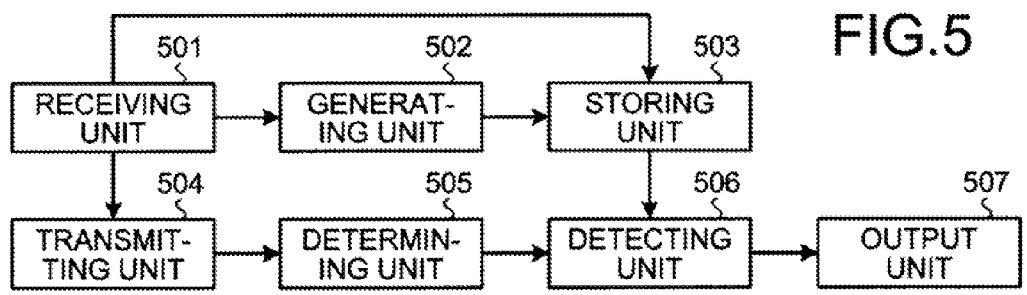
FIG.5
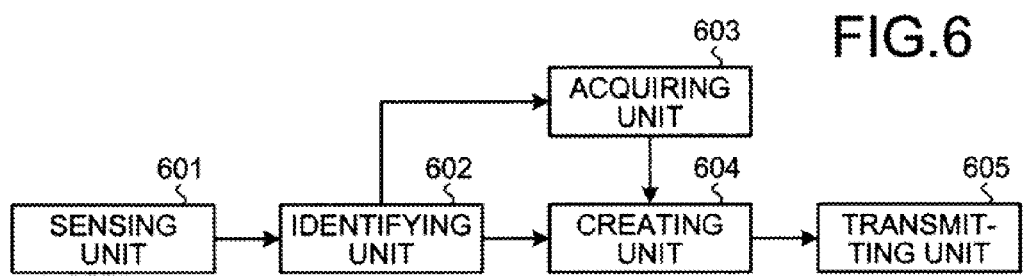
FIG.6

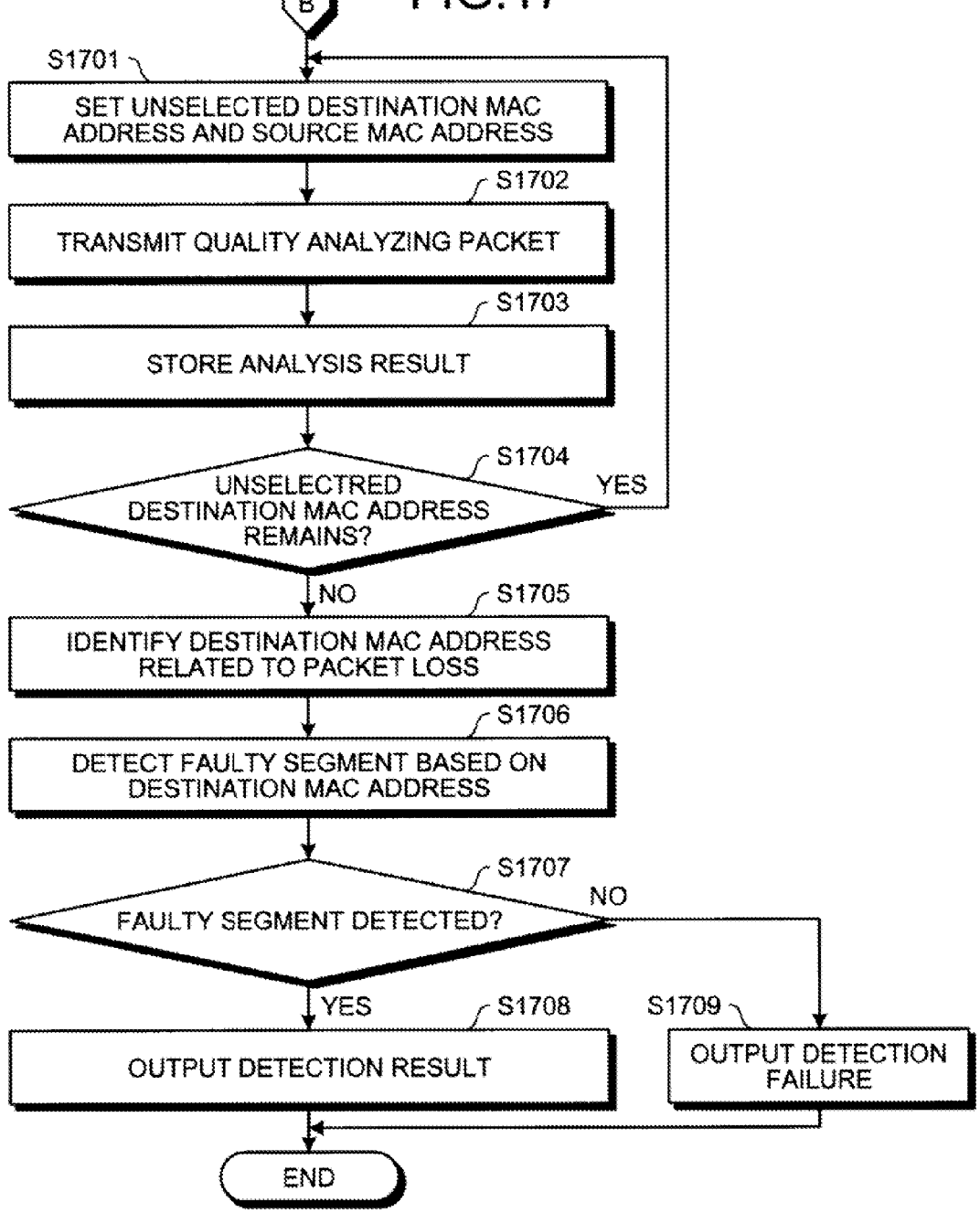

COMMUNICATION SYSTEM AND GENERATING APPARATUS

CROSS REFERENCE TO RELATED APPLICATIONS

This application is based upon and claims the benefit of priority of the prior Japanese Patent Application No. 2012-019284, filed on Jan. 31, 2012, the entire contents of which are incorporated herein by reference.

FIELD

The embodiments discussed herein are related to a communication system and a generating apparatus.

BACKGROUND

In recent years, Ethernet (registered trademark) has been built as a low level protocol of an Internet Protocol (IP) network to connect a server in a company and a customer. Generally, Ethernet is made up of layer 3 switches or layer 2 switches that switch a packet based on media access control (MAC) address.

Ethernet also uses a link aggregation technique that handles multiple links as one virtual link to obtain broader bandwidth and redundant architecture. When packet quality degrades, a segment where a failure has occurred (hereinafter "faulty segment") is detected accurately and the network is maintained.

The network tomography has been used to detect a faulty segment. According to the network tomography, a monitor is connected to a network to capture packets. The monitor captures packets and checks the quality of each packet. The monitor records segments through which a packet has passed with a routing protocol. The monitor creates a table that associates the quality of a packet with segments the packet has passes through. Based on the table, the monitor detects, as a faulty segment, a segment where the quality of a packet degrades (see, for example, Japanese Laid-open Patent Publication No. 2009-55113).

However, the above conventional technique cannot be applied to a case where multiple packets pass through the same path. Thus, the above conventional technique cannot detect a faulty segment from among segments on the path.

SUMMARY

According to an aspect of an embodiment, a communication system includes a switch that switches output ports according to an address of transmission data; a storing unit that stores a first set of addresses associated with the switch; a determining unit that determines, when a second set of addresses including in the transmission data a response to which is not received matches the first set of addresses in the storing unit, that there is a failure in the switch associated with the first set of addresses.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is a diagram depicting detection of a faulty segment performed by a detecting apparatus;

FIG. 2 is a diagram depicting a hardware configuration of a detecting apparatus 100;

FIG. 3 is a diagram depicting one example of the contents of a path management table 300;

FIG. 4 is a diagram depicting one example of the contents of a quality analysis result table 400;

FIG. 5 is a diagram depicting a functional configuration of the detecting apparatus 100;

FIG. 6 is a diagram depicting a functional configuration of a monitoring apparatus 200;

FIG. 17 is a flowchart depicting the faulty-segment detection process performed by the detecting apparatus 100.

DESCRIPTION OF EMBODIMENTS

Figure 7:
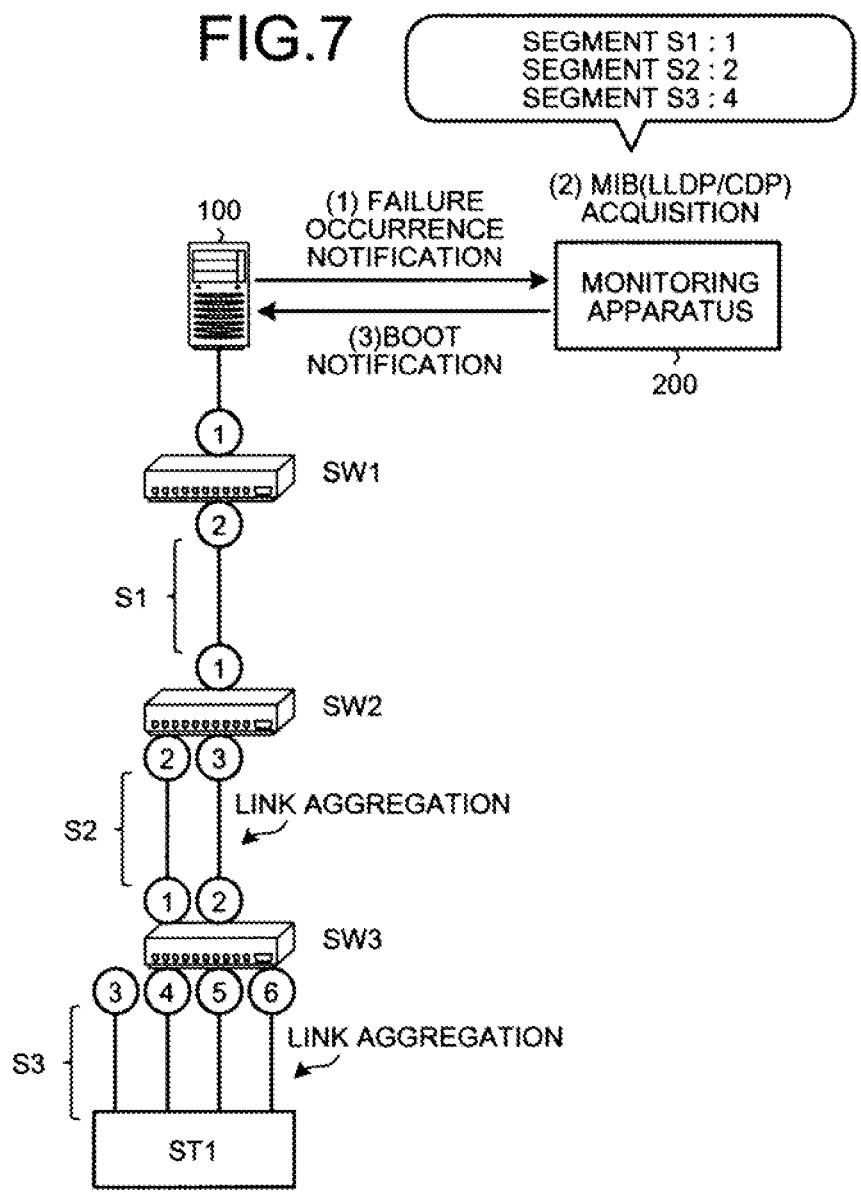
FIG. 7 is a diagram depicting a detecting apparatus boot process.

Preferred embodiments of a communication system and a generating apparatus will be explained with reference to the accompanying drawings.

A detecting apparatus, a detecting method, and a computer-readable recording medium storing a detecting program according to the embodiments separate elements in packets into a group according to the number of links in a segment. The elements are, for example, the remainder of the tail bit of source MAC addresses divided by the number of links in a segment of interest. The detecting apparatus detects, as a faulty segment, a segment where a group of elements related to the packet loss matches one of the groups associated with the segment. When packets each including one group of elements are lost in a segment, it is concluded that a failure occurs on one of the links in the segment. In this way, the detecting apparatus can detect a faulty segment.

FIG. 1 is a diagram depicting the detection of a faulty segment performed by a detecting apparatus. A network in FIG. 1 includes a detecting apparatus 100, a monitoring apparatus 200, a switch SW1, a switch SW2, a switch SW3, and a storage apparatus ST1.

The detecting apparatus 100 and the SW1 are connected with one link over this segment. The SW1 and SW2 are connected with one link over a segment S1. The SW2 and the SW3 are connected with two links over a segment S2. The SW3 and the storage apparatus ST 1 are connected with four links over a segment S3. When one segment includes multiple links, it is assumed that link aggregation is realized over that segment.

The detecting apparatus 100 detects a faulty segment. The detecting apparatus 100 receives a boot notification for a faulty-segment detection process and performs the detection of a faulty segment. The detecting apparatus 100 transmits quality analyzing packets that include identification information. The identification information varies in every quality analyzing packet and corresponds to identification information applied to each switch. The identification information is, for example, a source MAC address, a source IP address, a destination MAC address, or a destination IP address. When each switch adopts a source MAC address, the identification information is the source MAC address.

The detecting apparatus 100 measures the number of transmitted quality analyzing packets (hereinafter "a transmitted packet number") for each element of a group of identification information and also measures the number of quality analyzing packets having a packet loss (hereinafter "a lost packet number"). The detecting apparatus 100 determines, based on the number of transmitted packets and the number of lost packets, whether there is a packet loss in each element of a group of identification information. In this way, a faulty segment is detected from the combination of identification information having a packet loss.

When the detecting apparatus 100 adopts a source address as the identification information, the detecting apparatus 100 may alter an identifier that identifies the detecting apparatus 100 to the source address so that the detecting apparatus 100 can receive a response to the quality analyzing packet. For example, the detecting apparatus 100 installs devices that have the source addresses as the identification information. The detecting apparatus transmits a quality analyzing packet and receives a response through the devices.

The detecting apparatus 100 may create a virtual machine in the detecting apparatus 100 and change the address of the virtual machine. The detecting apparatus 100 sets the source address into the virtual machine so that a response to the quality analyzing packet can be received. In this case, the detecting apparatus 100 can receive a response to the quality analyzing packet without installing devices having source addresses.

The monitoring apparatus 200 monitors a network and detects a failure in the network. For example, the monitoring apparatus 200 identifies a path that undergoes the faulty-segment detection process when a failure occurs in the network. The monitoring apparatus 200 transmits a boot notification for booting the faulty-segment detection process to the detecting apparatus 100. The boot notification may include an address of a device at a start point of the path and an address of a device at a terminal point of the path as information concerning the path. The boot notification may include the number of links in segments on the path. In FIG. 1, the path starts from the detection apparatus 100 and terminates at the storage apparatus ST1 and includes segments S1 to S3.

The switches SW1 to SW3 relay a packet. For example, the SW1 relays a packet between the detecting apparatus 100 and the SW2. The SW2 relays a packet between the SW1 and the SW3. The SW2 sorts packets into links in the segment S2 according to a given rule.

The SW3 relays a packet between the SW2 and the storage apparatus ST1. The SW3 sorts packets into links in the segment S2 according to a given rule. The SW3 sorts packets into links in the segment S3 according to a given rule.

The given rule is a rule that sorts packets into links. Based on this rule, the switches distribute packets into multiple links, reducing load on the links. As a result, network congestion or a failure on a link is prevented. The sorting rule can be arbitrarily determined by a manufacture or a user of a switch. Examples of the sorting rule are explained below.

One example is that a bit at the tail of a source MAC address in a packet undergoes the modulo operation, divided by the number of links in a segment, and a link corresponding to the remainder receives the packet (hereinafter, "first sorting rule"). Instead of a bit at the tail of the source MAC address, a bit at the tail of a source IP address in a packet may be used. In the explanation below, the remainder of the modulo operation where the number of links n is the divisor is expressed as "Modulo (n)".

Another example is that a bit at the tail of a destination MAC address in a packet undergoes the modulo operation, divided by the number of links in a segment, and a link corresponding to the remainder receives the packet (hereinafter, "second sorting rule"). Instead of a bit at the tail of a destination MAC address, a bit at the tail of a destination IP address in a packet may be used.

Another example is that exclusive OR of bits at the tail of a source MAC address and a destination MAC address undergoes the modulo operation, divided by the number of links in a segment, and a link corresponding to the remainder receives the packet (hereinafter, "third sorting rule"). Instead of exclusive OR of bits at the tail of the source MAC address and the destination MAC address, exclusive OR of bits at the tail of a source IP address and a destination IP address in a packet may be used.

A faulty-segment detection process performed by the detecting apparatus 100 is explained assuming that a failure has occurred in segment S2. There can be multiple faulty-segment detection processes corresponding to the number of sorting rules adopted by each switch.

When the SW1 to SW3 adopt the first sorting rule, the detecting apparatus 100 performs a faulty-segment detection process according to the first sorting rule. In this case, the detecting apparatus 100 can detect a faulty segment when the SW1 to SW3 adopt the first sorting rule. FIG. 1 depicts that the detecting apparatus 100 performs the faulty-segment detection process according to the first sorting rule.

When the SW1 to SW3 adopt the second sorting rule, the detecting apparatus 100 performs a faulty-segment detection process according to the second sorting rule. In this case, the detecting apparatus 100 can detect a faulty segment when the SW1 to SW3 adopt the second sorting rule.

When the SW1 to SW3 adopt the third sorting rule, the detecting apparatus 100 performs a faulty-segment detection process according to the third sorting rule. In this case, the detecting apparatus 100 can detect a faulty segment when the SW1 to SW3 adopt the third sorting rule.

As long as the detecting apparatus 100 knows a sorting rule adopted by the switches SW1 to SW3, the detecting apparatus 100 can select a faulty-segment detection process corresponding to the sorting rule. When the detecting apparatus 100 does not know a sorting rule adopted by the switches SW1 to SW3, the detecting apparatus 100 may perform, one by one, faulty-segment detection processes corresponding to the first to third sorting rules.

(1) When the detecting apparatus 100 receives a boot notification of a faulty-segment detection process from the monitoring apparatus 200, the detecting apparatus 100 transmits quality analyzing packets and analyzes quality over the segments S1 to S3 on a path to be analyzed.

The detecting apparatus 100 arranges that at least one quality analyzing packet passes through each link when the first sorting rule is applied. As a result, the detecting apparatus 100 can analyze the quality of each link over the segments S1 to S3.

For example, the detecting apparatus 100 acquires the number of links over each segment. The number of links over each segment is acquired from each switch. The number of links over each segment may be included in the boot notification. The detecting apparatus 100 identifies the maximal number of links.

The detecting apparatus 100 identifies, based on the maximal number of links, a source MAC address that is included in a quality analyzing packet so that at least one quality analyzing packet is allocated to every link of the segment having the maximal number of links under the first sorting rule. As a result, at least one quality analyzing packet passes through each link on the path under the first sorting rule.

In FIG. 1, the detecting apparatus 100 determines that the segment S3 has the maximal number of links, four links. The detecting apparatus 100 identifies a source MAC address that is included in a quality analyzing packet so that a quality analyzing packet is allocated to each link of the segment S3 under the first sorting rule.

Since the maximal number of links is four, the detecting apparatus 100 identifies source MAC addresses whose tail bits yield 0 to 3, the members of Modulo (4). In FIG. 1, the detecting apparatus 100 identifies "aa:bb:cc:dd:ee:00" to "aa:bb:cc:dd:ee:03" as the source MAC addresses.

The detecting apparatus 100 transmits quality analyzing packets including the source MAC addresses. In FIG. 1, the detecting apparatus 100 generates quality analyzing packets including four types of source MAC addresses. More specifically, the detecting apparatus 100 generates quality analyzing packets including source MAC addresses of "aa:bb:cc:dd:ee:00" to "aa:bb:cc:dd:ee:03" respectively. The detecting apparatus 100 transmits the quality analyzing packets to the storage apparatus ST1.

The detecting apparatus 100 determines whether a packet loss has occurred for each source MAC address. The detecting apparatus 100 waits for a response to a quality analyzing packet from the storage apparatus ST1 and when the response is not received during a given period, the detecting apparatus 100 counts the quality analyzing packets as a lost packet and stores the counted number in a quality analysis result table 400. The detail of the quality analysis result table 400 is explained later with reference to FIG. 4.

The detecting apparatus 100 can determine which source MAC address among "aa:bb:cc:dd:ee:00" to "aa:bb:cc:dd:ee:03" has been included in a lost packet. Thus, the determining apparatus 100 can identify a combination of source MAC addresses related to the packet loss.

(2) The detecting apparatus 100 separates source MAC addresses in the quality analyzing packets into groups according to the first sorting rule and the number of links in the segments S1 to S3. More specifically, the detecting apparatus 100 determines which group of source MAC addresses is allocated to which link in the segments S1 to S3. The detecting apparatus 100 associates the groups with the segments and stores the groups and the segments in a path management table 300. The detail of the path management table 300 is explained later with reference to FIG. 3.

In FIG. 1, according to the first sorting rule, quality analyzing packets including source MAC addresses "aa:bb:cc:dd:ee:00" to "aa:bb:cc:dd:ee:03" are allocated to one link in the segment S1. Therefore, the detecting apparatus 100 associates a group of the source MAC addresses "aa:bb:cc:dd:ee:00" to "aa:bb:cc:dd:ee:03" with the segment S1 and stores the group and the segment S1 in the path management table 300.

Quality analyzing packets including source MAC addresses "aa:bb:cc:dd:ee:00" and "aa:bb:cc:dd:ee:02" respectively are allocated to one of the two links in the segment S2 under the first sorting rule. The other link in the segment S2 receives quality analyzing packets including source MAC addresses "aa:bb:cc:dd:ee:01" and "aa:bb:cc:dd:ee:03" respectively.

The detecting apparatus 100 stores a group of source MAC addresses "aa:bb:cc:dd:ee:00" and "aa:bb:cc:dd:ee:02" associated with the segment S2. The detecting apparatus 100 stores a group of source MAC addresses "aa:bb:cc:dd:ee:01" and "aa:bb:cc:dd:ee:03" associated with the segment S2.

In FIG. 1, according to the first sorting rule, a quality analyzing packet including a source MAC address "aa:bb:cc:dd:ee:00" is allocated to one of four links in the segment S3. One of the remaining links receives a quality analyzing packet including a source MAC address "aa:bb:cc:dd:ee:01". One of the remaining links receives a quality analyzing packet including a source MAC address "aa:bb:cc:dd:ee:02". The last link receives a quality analyzing packet including a source MAC address "aa:bb:cc:dd:ee:03".

Therefore, the detecting apparatus 100 stores a group of a source MAC address "aa:bb:cc:dd:ee:00" associated with the segment S3. The detecting apparatus 100 stores a group of source MAC addresses "aa:bb:cc:dd:ee:01" associated with the segment S3. The detecting apparatus 100 stores a group of source MAC addresses "aa:bb:cc:dd:ee:02" associated with the segment S3. The detecting apparatus 100 stores a group of source MAC addresses "aa:bb:cc:dd:ee:03" associated with the segment S3.

In this way, when a failure occurs on a link in a segment, the detecting apparatus 100 can conclude that a group of source MAC addresses in a quality analyzing packet allocated to the link is one of the groups of source MAC addresses associated with the segment. As a result, the detecting apparatus 100 can identify a group of source MAC addresses in a quality analyzing packet that passes through the faulty link and leads to the packet loss.

When a failure occurs on a link in the segment S2, the detecting apparatus 100 can conclude that one of the two groups associated with the segment S2 is included in a quality analyzing packet that is sorted into that link. The detecting apparatus 100 identifies a quality analyzing packet including one of the groups of source MAC addresses that becomes a lost packet.

In this way, when a failure occurs on a link in a segment, the detecting apparatus 100 knows that a quality analyzing packet including one of the groups of source MAC addresses associated with the segment can be allocated to the link. However, the detecting apparatus 100 does not know which group of source MAC addresses is allocated to the link.

The detecting apparatus 100 detect a faulty segment based on the result of (1) above, the decision of whether there is a packet loss for each source MAC address, and the groups of source MAC addresses stored at (2) above being associated with the segments S1 to S3. The detecting apparatus 100 may identify, from the quality analysis result table 400, the combination of source MAC addresses related to the packet loss.

The detecting apparatus 100 finds a group matching the combination of source MAC addresses related to the packet loss from among the groups of source MAC addresses associated with the segments S1 to S3. The detecting apparatus 100 detects a segment associated with the group as a faulty segment.

It is assumed that quality analyzing packets including source MAC addresses "aa:bb:cc:dd:ee:01" and "aa:bb:cc:dd:ee:03" respectively are lost. The combination of source MAC addresses "aa:bb:cc:dd:ee:01" and "aa:bb:cc:dd:ee:03" matches the group associated with the segment S2. Therefore, the detecting apparatus 100 detects the segment S2 as a faulty segment.

In this way, the detecting apparatus 100 detects which segment is a faulty segment. The detecting apparatus 100 may output information concerning the faulty segment to a display of the detecting apparatus 100 or to the monitoring apparatus 200 so that a user (for example, a network administrator) of the detecting apparatus 100 or the monitoring apparatus 200 recognizes the faulty segment. As a result, the network administrator acknowledges the faulty segment and makes use of the result to maintain and manage the network.

As mentioned in (2) above, the detecting apparatus 100 does not know which group of source MAC addresses is allocated to which link of the faulty segment. Therefore, the detecting apparatus 100 does not detect which link of the faulty segment is the origin of the failure.

The detecting apparatus 100 may detect a link being the origin of the failure with a conventional technique for identifying a faulty link in a segment. The network administrator may check the faulty segment and identify the faulty link after the network administrator recognizes the faulty segment from the output of the detecting apparatus 100.

FIG. 2 is a diagram depicting a hardware configuration of the detecting apparatus 100. The detecting apparatus 100 includes a central processing unit (CPU) 201, a read-only memory (ROM) 202, a random access memory (RAM) 203, and an interface (I/F) 204. Each element is connected via a bus 200 to each other.

The CPU 201 governs the entire control of the detecting apparatus 100. The ROM 202 stores a program such as a boot program or a detecting program. The RAM 203 is used as a work area of the CPU 201. The RAM 203 stores the path management table depicted in FIG. 3 and the quality analysis result table 400.

The I/F 204 is connected to a network 210 and connected to devices in the network 204. The devices include the storage apparatus ST1, a layer 2 switch, and a layer 3 switch. The I/F 204 governs the interface between the network 210 and the detecting apparatus 100, and controls the data input and output related to an external device.

With reference to FIG. 3, the contents of the path management table 300 are explained. The path management table 300 is a table possessed by the detecting apparatus 100 and stores path information. The path information is information concerning a path in the network 210 including the number of links in each segment on the path and a group of source MAC addresses corresponding to each segment. The path management table 300 is realized by a storage device such as the ROM 202 and the RAM 203.

FIG. 3 is a diagram depicting one example of the contents of the path management table 300. The path management table 300 includes a segment number column, a number-of-links column, and an identifier group column, forming records for each segment.

The segment number column stores the number identifying a segment on the network 210. The number-of-links column stores the number of links in a segment. The identifier group column stores a group of source MAC addresses. The identifier group column may store a group of destination MAC addresses.

FIG. 4 is a diagram depicting one example of the contents of the quality analysis result table 400. The quality analysis result table 400 is owned by the detecting apparatus 100 and stores a result of transmitting a quality analyzing packet (transmission result) and a result of the quality analysis (analysis result). The transmission result includes the number of transmitted packets and the number of lost packets. The analysis result indicates whether a packet is lost. The quality analysis result table 400 is realized by a storage device such as the ROM 202 and the RAM 203.

The quality analysis result table 400 includes a Modulo (n) column, a number-of-transmitted-packet column, a number-of-lost-packet column, and an analysis result column, and forms records for each Modulo (n). The Modulo (n) indicates a remainder of a bit of a source MAC address divided by n. The "n" indicates the maximal number of links of a segment in all segments on the path.

The Modulo (n) column stores Modulo (n) of a source MAC address in a quality analyzing packet. The Modulo (n) column may store Modulo (n) of a destination MAC address. The number-of-transmitted-packet column stores the number of quality analyzing packets including a source MAC address that corresponds to a value in the Modulo (n) column. The number-of-lost-packet column stores the number of lost quality analyzing packets.

The analysis result column stores a result of the quality analysis obtained from the number of transmitted packets and the number of lost packets. The quality analysis result indicates whether a packet is lost that has a source identifier corresponding to a value in the Modulo (n) column. In FIG. 4, the analysis result column shows "O" when there is not a packet loss and "x" when there is a packet loss. The detecting apparatus 100 may determine that there is a packet loss when the number of lost packets is at least a given threshold or when a ratio of lost packets to transmitted packets is at least a given threshold.

The detecting apparatus 100 may lower the threshold for determining the packet loss in the case of a service (for example, voice communication) that is influential in customers. On the other hand, the detecting apparatus 100 may raise the threshold when dealing with a service (for example, web browsing) that is not influential in customers. Although the packet loss is determined based on the transmitted packets and the lost packets in FIG. 4, the packet loss may be determined based on the lost packets.

A hardware configuration of the monitoring apparatus 200 is explained. The hardware configuration of the monitoring apparatus 200 is similar to that of the detecting apparatus 100 in FIG. 2 and thus the explanation thereof is omitted. In the explanation below, it is assumed that the detecting apparatus 100 and the monitoring apparatus 200 are different apparatuses. However, the detecting apparatus 100 and the monitoring apparatus 200 may form one apparatus.

FIG. 5 is a diagram depicting a functional configuration of the detecting apparatus 100. The detecting apparatus 100 includes a receiving unit 501, a generating unit 502, a storing unit 503, a transmitting unit 504, a determining unit 505, a detecting unit 506, and an output unit 507. The receiving unit 501, the generating unit 502, and the transmitting unit 504 to the output unit 507 are realized by the I/F 204 or the CPU 201 executing a program stored in a storage device such as the ROM 202 and the RAM 203.

The detecting apparatus 100 may detect a faulty segment, as depicted in FIG. 1, based on the combination of pieces of identification information related to the packet loss or based on the number of pieces of identification information related to the packet loss. A process where the detecting apparatus 100 detects a faulty segment based on the combination of pieces of identification information related to the packet loss is explained. A detailed example of detecting a faulty segment based on the combination of pieces of identification information related to the packet loss will also be explained later with reference to FIG. 8 and FIG. 9.

The receiving unit 501 receives a boot notification of a faulty-segment detection process. The boot notification may be a notification requesting the execution of the faulty-segment detection process or a notification requesting the boot of a virtual machine that executes the faulty-segment detection process. The boot notification is transmitted from the monitoring apparatus 200 when the monitoring apparatus 200 detects a fault in a network. The boot notification may be input from a user of the detecting apparatus 100 when the user thinks that there occurs a fault in a network.

The boot notification may include information concerning a path and the number of links in each segment on the path when the detecting apparatus 100 does not acquire such information. In this case, the information concerning the path and the number of links in segments on the path is acquired by, for example, the monitoring apparatus 200.

The boot notification may include identification information that is given to a quality analyzing packet when the detecting apparatus 100 does not generates the identification information. The boot notification may include identification that indicates an address to which a quality analyzing packet is transmitted. In this case, the monitoring apparatus 200 generates the identification information given to the quality analyzing packet or the identification information indicating the address.

The boot notification may include grouping information when the detecting apparatus 100 does not generate information concerning grouping. More specifically, the boot notification may include groups of identification information which is grouped according to the maximal number of links and an element (commonality) included in the identification information. In this case, the monitoring apparatus 200 generates the grouping information.

The grouping information is information concerning a group of identification information that is present in a quality analyzing packet and is associated with segments. More specifically, the grouping information is a set of identification information that is possessed by a packet whose route is switched at output ports of the switches. In other words, the grouping information tells which identification information relates to the detection of a link where a failure occurs.

The identification information is information corresponding to the sorting rules. The identification information is for example, a value included in a source MAC address or a source IP address. When each switch adopts the first sorting rule, the detecting apparatus 100 uses a value in a source MAC address as the identification information and detects a faulty segment.

The boot notification may include identification information grouped according to remainders of the modulo operation for each segment on paths leading to multiple destinations.

The identification information is information corresponding to the sorting rules. The identification information may be a destination MAC address, a destination IP address, exclusive OR of a destination MAC address and a source MAC address, or exclusive OR of a destination IP address and a source IP address. For example, when each switch adopts the second sorting rule, the detecting apparatus 100 uses a value in the destination MAC address as the identification information and detects a faulty segment. When each switch adopts the third sorting rule, the detecting apparatus 100 uses a value of exclusive OR of values in the destination MAC address and the source MAC address and detects a faulty segment.

The receiving unit 501 receives a boot notification of a faulty-segment detection process from the monitoring apparatus 200. The receiving unit 501 may receive a boot notification from a user of the detecting apparatus 100. In this way, the receiving unit 501 receives a trigger to start the faulty-segment detection process. The receiving unit 501 receives information used in the faulty-segment detection process. The received boot notification is stored in the RAM 203. When the boot notification includes the grouping information, the grouping information is stored in the storing unit 503.

The generating unit 502 generates the grouping information when the boot notification received by the receiving unit 501 does not include the grouping information. In this way, the generating unit 502 generates information used for the faulty segment detection.

The storing unit 503 stores the grouping information. The storing unit 503 may store the information beforehand, store the grouping information generated by the generating unit 502, or store the grouping information received by the receiving unit 501. The storing unit 503 is realized by the identifier group column of the path management table 300 in FIG. 3.

The transmitting unit 504 transmits packets each of which includes identification information related to the maximal number of links on the path. The identification information is information corresponding to the sorting rules and may be a value included in the source MAC address or source IP address. Packets are quality analyzing packets. A quality analyzing packet is, for example, one created by PING and is used for the analysis of the packet loss, monitoring a response. The transmitting unit 504 prepares identification information blocks equal to the maximal number of links and arranges that at least one packet passes through each link of the path.

The transmitting unit 504 generates quality analyzing packets and transmits the quality analyzing packets to the destination. The transmitting unit 504 activates a virtual machine in the detecting apparatus 100 and replaces the identification information representing the virtual machine with source MAC addresses the number of which equals to the maximal number of links. Every time the transmitting unit 504 changes the identification information representing the virtual machine, the transmitting unit 504 transmits a quality analyzing packet including new identification information.

In this way, the transmitting unit 504 transmits quality analyzing packets to the destination through links. The transmitting unit 504 may generate a virtual machine and change an address of the virtual machine so that an identifier of the detecting apparatus can be changed one after another. As a result, the transmitting unit 504 can receive a response to a quality analyzing packet even a source MAC address is changed.

The transmitting unit 504 may transmit packets including identification information amounting to the maximal number of links to destinations corresponding to the identification information. In this case, the identification information may be a value in a destination MAC address, a destination IP address, exclusive OR of a destination MAC address and a source MAC address, or exclusive OR of a destination IP address and a source IP address.

The transmitting unit 504 generates quality analyzing packets including destination MAC addresses equal to the maximal number of links and sends the packets to the destinations indicated by the destination MAC addresses. In this way, the transmitting unit 504 transmits the quality analyzing packets to the destinations through links based on the destination MAC addresses.

The determining unit 505 determines whether the packet loss occurs. More specifically, the determining unit 505 determines whether a set of identification information identical to those of lost transmission data is present in the storing unit 503. The transmission data is a quality analyzing packet. The determining unit 505 concludes that a switch related to the identification information that is present in the storing unit 503 is not working properly.

The determining unit 505 measures the number of quality analyzing packets to which a response is not received within a given time period. The determining unit 505 checks whether there is a lost packet based on the number of transmitted packets and lost packets and stores a check result in the quality analysis result table 400. When a lost packet is found, the determining unit 505 determines that a switch related to the identification number in the lost packet is operating erroneously. In this way, the determining unit 505 can identify a group of identification information related to the packet loss.

The detecting unit 506 detects a segment to which the transmission data is sent based on the erroneously operating switch. The detecting unit 506 detects a segment having a group of the identification information identical to the identification information related to the packet loss. The detecting unit 506 detects a group corresponding to the combination of identification information related to the packet loss from the identifier group column of the path management table 300 and also detects a segment number from the segment number column corresponding to the group.

When a group of source MAC addresses that is related to the packet loss is "aa:bb:cc:dd:ee:00", the detecting unit 506 detects the segment number S3 from the path management table 300. In this way, the detecting unit 506 can detect information indicating the segment having a failure.

The output unit 507 outputs a result of the detection performed by the detecting unit 506. The output unit 507 transmits the information indicating the segment detected by the detecting unit 506 to the monitoring apparatus 200. The output unit 507 may output the information to the display of the detecting apparatus. In this way, the output unit 507 notifies the network administrator of the network 210 with the segment having a failure.

When the transmitting unit 504 does not know the sorting rule of each switch and cannot detect a faulty segment, the transmitting unit 504 may use identification corresponding to another sorting rule.

When a packet having a value included in a source address as the identification information is transmitted and a response is not received, the transmitting unit 504 may replace the value with a value included in a destination address and send a packet. The source address is, for example, a source MAC address or a source IP address. Or the transmitting unit 504 may replace the value with a value included in exclusive OR of a source address and a destination address. The destination address is, for example, a destination MAC address or a destination IP address.

When a packet having a value included in a destination address as the identification information is transmitted and a response is not received, the transmitting unit 504 may replace the value with a value included in a source address and send a packet. When a packet having a value included in a destination address is transmitted and a response is not received, the transmitting unit 504 may replace the value with a value included in exclusive OR of a source address and a destination address.

When a packet having a value included in exclusive OR of a source address and a destination address is transmitted and a response is not received, the transmitting unit 504 may replace the value with a value included in a destination address. When a packet having a value included in exclusive OR of a source address and a destination address is transmitted and a response is not received, the transmitting unit 504 may replace the value with a value included in a source address. In this way, the transmitting unit 504 can try to detect a faulty segment with various sorting rules even when sorting rules adopted by switches are unknown.

A case where the detecting apparatus 100 detects a faulty segment based on the number of pieces of identification information related to the packet loss is explained. An example of the faulty segment detection on the basis of the number of pieces of identification information related to the packet loss is explained later with reference to FIG. 10. In the example below, functions of the transmitting unit 504 and the output unit 507 are similar to the case where a faulty segment is detected based on the combination of identification information related to the packet loss.

The receiving unit 501 receives a boot notification. The boot notification may include the grouping information used for the detection of a faulty segment. For example, the boot notification includes the grouping information indicating the number of pieces of identification information within a group.

The grouping information indicating the number of pieces of identification information is information where each segment is associated with the number of quality analyzing packets sent to each link. The grouping information indicates the number of elements within a set of identification information. In other words, the grouping information indicates how many quality analyzing packets could be lost when one of the links suffers a failure. The identification information is, for example, a value included in a source MAC address or a source IP address.

The boot notification may include the grouping information indicating the number of pieces of identification information with a group. The identification information may be a value included in a destination MAC address, a destination IP address, exclusive OR of a destination MAC address and a source MAC address, or exclusive OR of a destination IP address and a source IP address.

The generating unit 502 generates the grouping information when the notification information does not include the grouping information. In this way, the generating unit 502 can generate information used for the detection of a faulty segment.

The storing unit 503 stores the grouping information. The storing unit 503 may the grouping information beforehand, may store the grouping information generated by the generating unit 502, or the grouping information received by the receiving unit 501. The storing unit 503 may be realized by the identifier group column in the path management table 300 in FIG. 3.

The determining unit 505 determines whether there is a lost packet. The determining unit 505 may determine whether the storing unit 503 stores the number identical to the number of elements in the identification information set included in the transmission data. When the storing unit 503 stores the number, the determining unit 505 determines that a fault occurs in a switch corresponding to the identification information set identical to the number.

The determining unit 505 may counts, as lost packets, quality analyzing packets a response to which has not been received within a given time period. The determining unit 505 analyzes the packet loss based on the number of transmitted packets and the number of lost packets and stores a result of the analysis in the quality analysis result table 400. The determining unit 505 determines that a failure occurs in a switch that receives the identification related to the packet loss. In this way, the determining unit 505 can identify a group of identification information related to the packet loss.

The detecting unit 506 detects a segment based on the switch detected by the determining unit 505. For example, the detecting unit 506 detects a segment having the number of pieces of identification information identical to that determined by the determining unit 505. In this way, the detecting unit 506 can detect information indicating a segment having a trouble.

Functions of the transmitting unit 504 may be realized by a virtual machine of the detecting unit. Functions of the receiving unit 501, the generating unit 502, and the determining unit 505 to the output unit 507 may also be realized by the virtual machine.

With reference to FIG. 6, a functional configuration of the monitoring apparatus 200 is explained.

FIG. 6 is a diagram depicting a functional configuration of the monitoring apparatus 200. The monitoring apparatus 200 includes a sensing unit 601, an identifying unit 602, an acquiring unit 603, a creating unit 604, and a transmitting unit 605. The sensing unit 601 to the transmitting unit 605 are realized by the I/F 204 or the CPU 201 executing a program stored in a storage device such as the ROM 202 and the RAM 203 in FIG. 2.

The sensing unit 601 senses a failure in the network 210. For example, the sensing unit 601 receives a notification from the detecting apparatus 100 that a response to a packet sent to the storage apparatus ST1 has not been received by the detecting apparatus 100 and knows a failure in the network 210. The sensing unit 601 may capture packets flowing in the network 210. If a sequence number of the packets is missing, there is a failure in a network. In this way, the monitoring apparatus 200 obtains a trigger for sending the boot notification to the detecting apparatus 100.

The identifying unit 602 identifies a path from a computer in the network 210 to a destination, based on information concerning the failure. The identifying unit 602 identifies a path to a destination from which a response has not returned. The identifying unit 602 may identify a path whose sender and receiver are written in a packet preceding or following a packet of the missing sequence number. In this way, the identifying unit 602 can identify a path that is checked by the faulty-segment detection process.

The identifying unit 602 identifies, based on the information on the failure sensed by the sensing unit 601, paths from the computer in the network 210 to multiple destinations. More specifically, the identifying unit 602 identifies a path to the destination from which a response has not been received and other paths that partially overlap the path. The identifying unit 602 may identify a path based on a packet preceding or following a packet of the missing sequence number and other paths that partially overlap the path. In this way, the identifying unit 602 can identify a path to be examined.

The acquiring unit 603 acquires topological information on the network 210. The acquiring unit 603 acquires the topological information from the switches on the path identified by the identifying unit 602, acquiring the number of links in each segment on the path. In this way, the acquiring unit 603 acquires information used for the faulty-segment detection process.

The creating unit 604 creates grouping information that indicates a group of identification information which is grouped by an element included in the identification information and the maximal number of links on the path identified by the identifying unit 602. The grouping information is a set of identification information output from output ports of a switch on the path. For example, the grouping information is path information in the path management table 300 in FIG. 3. The identification information indicates, for example, a value in a source MAC address, a source IP address, a destination MAC address, or a destination IP address. The identification information may be a value in exclusive OR of a destination MAC address and a source MAC address or exclusive OR of a destination IP address and a source IP address. In this way, the creating unit 604 generates the grouping information used for the detection of a faulty segment.

The creating unit 604 generates grouping information that indicates groups of identification information divided by the maximal number of links and an element included in the identification information. The grouping information is a set of identification information that is output from an output port of a switch to a link. The grouping information is path information in the path management table 300 in FIG. 3. In this way, the creating unit 604 can create the grouping information used for the faulty segment detection.

The transmitting unit 605 transmits the grouping information to the computer. The transmitting unit 604 transmits a boot notification including the grouping information to the detecting apparatus 100 when the detecting apparatus 100 does not generate the grouping information. In this way, the transmitting unit 605 permits the detecting apparatus 100 to execute the faulty-segment detection process by sending the boot notification and by sending the grouping information to the detecting apparatus 100 even when the detecting apparatus 100 does not generate the grouping information.

When the detecting apparatus 100 does not acquire information concerning a path or the number of links in segments on the path, the boot notification may include information concerning a path or the number of links in segments on the path. In this case, the monitoring apparatus 200 acquires such information. In this way, the transmitting unit 605 transmits the information to the detecting apparatus 100 so that the detecting apparatus 100 need not acquire the information.

When the detecting apparatus 100 does not generate identification information, the boot notification may include the identification information. In this case, the monitoring apparatus 200 generates the identification information. The boot notification may include the identification information. In this way, the transmitting unit 605 transmits the identification information to the detecting apparatus 100 so that the detecting apparatus 100 need not generate the identification information.

With reference to FIG. 7, a detecting apparatus boot process performed when the monitoring apparatus 200 senses a failure in the network 210.

FIG. 7 is a diagram depicting the detecting apparatus boot process. (1) The monitoring apparatus 200 senses a failure in the network 210. For example, the monitoring apparatus 200 receives, from the detecting apparatus 100, a notification that the detecting apparatus has not received a response to a packet sent to the storage apparatus ST1.

(2) The monitoring apparatus 200 selects, based on the notification, a path from the detecting apparatus 100 to the storage apparatus ST1. The monitoring apparatus 200 acquires, with the SNMP, the management information base (MIB) from each switch on the path, acquiring topological information of the network 210.

More specifically, the monitoring apparatus 200 collects information based on the link layer discovery protocol (LLDP) or the Cisco discovery protocol (CDP) and figures out which port of the switches is connected to which port of the other switches. In FIG. 7, port 2 of the SW1 is connected to port 1 of the SW 2.

In this way, the monitoring apparatus 200 can acquire the topological information such as the connection between switches on the path and the number of links in each segment. The monitoring apparatus 200 holds the number of links in each segment on the path.

The SNMP is a protocol for the monitoring and the management of a UDP/IP-based network. The SNMP monitors the state or the traffic of a network and disconnects a link. The monitoring apparatus 200 may hold the topological information of the network 210 beforehand.

(3) The monitoring apparatus 200 sends a boot notification of the faulty-segment detection process to the detecting apparatus 100. The boot notification may include information concerning the connection between the switches on the path and the number of links in each segment on the path.

The monitoring apparatus 200 may select a source identifier or a destination identifier that is to be included in a quality analyzing packet sent out by the detecting apparatus 100. The boot notification many include the source identifier or the destination identifier.

Figure 8:
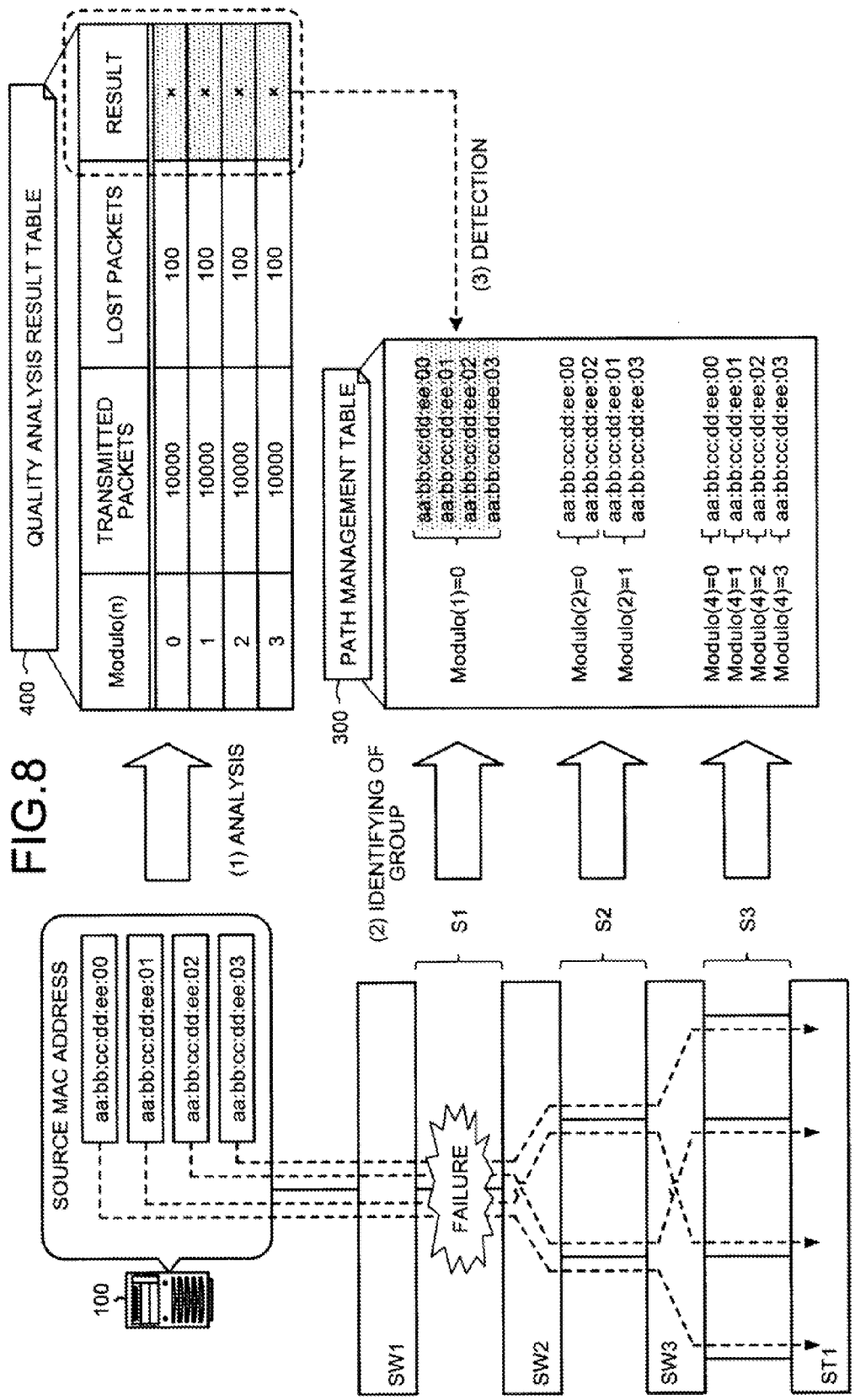
FIG. 8 is a diagram depicting a first example of a faulty segment detection.
Figure 9:
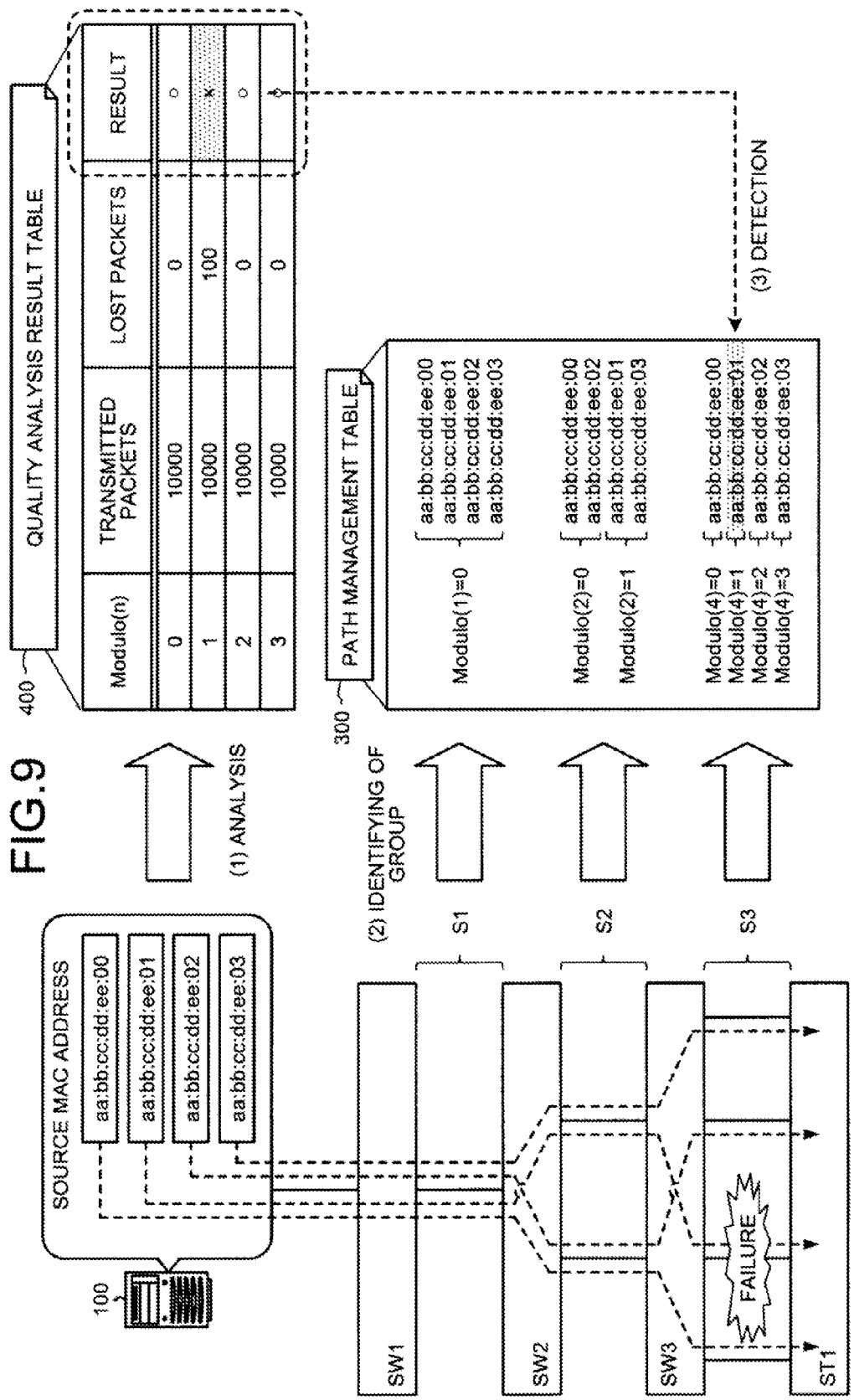
FIG. 9 is a diagram depicting the first example of the faulty segment detection.

With references to FIG. 8 and FIG. 9, a first example of the faulty-segment detection process performed by the detecting apparatus 100 is explained. In the first example, a faulty segment is detected based on the combination of identification information related to the packet loss as explained in FIG. 1.

FIG. 8 and FIG. 9 are diagrams depicting the first example of the faulty segment detection. Those explained with reference to FIG. 1 are omitted here. It is assumed that a failure has occurred in segment S1.

(1) The detecting apparatus 100 identifies the maximal number of links over the segments S1 to S3. The detecting apparatus 100 selects a source MAC address to be given to a quality analyzing packet under the first sorting rule.

In FIG. 8, the detecting apparatus 100 identifies "aa:bb:cc:dd:ee:00" to "aa:bb:cc:dd:ee:03" as source MAC addresses corresponding to Modulo (4). The detecting apparatus 100 generates quality analyzing packets including "aa:bb:cc:dd:ee:00" to "aa:bb:cc:dd:ee:03" respectively.

The detecting apparatus 100 sends the quality analyzing packets to the storage apparatus ST1. The detecting apparatus 100 waits for a response from the storage apparatus 100 and if the response is not received within a given time period, stores a result as loss packets in the quality analysis table 400.

In this way, the detecting apparatus 100 detects which source MAC address relates to the packet loss. The detecting apparatus 100 identifies the combination of source MAC addresses related to the packet loss.

(2) The detecting apparatus 100 separates source MAC addresses into groups as depicted in FIG. 1 and store the groups in the path management table 300.

In FIG. 8, the detecting apparatus 100 stores a group of source MAC addresses "aa:bb:cc:dd:ee:00" to "aa:bb:cc:dd:ee:03" associated with segment S1.

The detecting apparatus 100 stores a group of source MAC addresses "aa:bb:cc:dd:ee:00" and "aa:bb:cc:dd:ee:02" associated with segment S2 and also stores a group of "aa:bb:cc:dd:ee:01" and "aa:bb:cc:dd:ee:03" associated with segment S2.

The detecting apparatus 100 stores a group of source MAC address "aa:bb:cc:dd:ee:00" associated with segment S3, a group of source MAC address "aa:bb:cc:dd:ee:01" associated with segment S3, a group of source MAC address "aa:bb:cc:dd:ee:02" associated with segment S3, and a group of source MAC address "aa:bb:cc:dd:ee:03" associated with S3.

(3) The detecting apparatus 100 detects a faulty segment based on the packet loss and the groups of source MAC addresses associated with the segments.

In FIG. 8, the quality analyzing packets including "aa:bb:cc:dd:ee:00" to "aa:bb:cc:dd:ee:03" are lost. The combination of "aa:bb:cc:dd:ee:00" to "aa:bb:cc:dd:ee:03" is a group associated with segment S1. Therefore, the detecting apparatus 100 detects segment S1 as a faulty segment.

With reference to FIG. 9, the faulty-segment detection process performed by the detecting apparatus 100 when a failure has occurred in segment S3 is explained.

(1) The detecting apparatus 100 identifies "aa:bb:cc:dd:ee:00" to "aa:bb:cc:dd:ee:03" as four source MAC addresses each having different remainders of the modulo operation. The detecting apparatus 100 generates quality analyzing packet including "aa:bb:cc:dd:ee:00" to "aa:bb:cc:dd:ee:03" as source MAC addresses.

The detecting apparatus 100 transmits quality analyzing packets including one of "aa:bb:cc:dd:ee:00" to "aa:bb:cc:dd:ee:03" to the storage apparatus ST1. The detecting apparatus 100 waits for a response from the storage apparatus ST1 and when there is no response within a given time, counts the packet as a lost packet and stores the result in the quality analysis table 400.

In this way, the detecting apparatus 100 can determine which source MAC address is related to the packet loss. The detecting apparatus 100 can identify which combination of source MAC addresses is related to the packet loss.

(2) The detecting apparatus 100 divides source MAC addresses into groups in light of the number of links in the segments S1 to S3 and stores the groups in the path management table 300 as in FIG. 8. In FIG. 9, the detecting apparatus 100 stores source MAC addresses "aa:bb:cc:dd:ee:00" to "aa:bb:cc:dd:ee:03" corresponding to segment S1.

The detecting apparatus 100 stores source MAC addresses "aa:bb:cc:dd:ee:00" and "aa:bb:cc:dd:ee:02" corresponding to segment S2. The detecting apparatus 100 stores MAC addresses "aa:bb:cc:dd:ee:01" and "aa:bb:cc:dd:ee:03" corresponding to segment S2.

The detecting apparatus 100 stores a source MAC address "aa:bb:cc:dd:ee:00" corresponding to segment S3. The detecting apparatus 100 stores a source MAC address "aa:bb:cc:dd:ee:01" corresponding to segment S3. The detecting apparatus 100 stores a source MAC address "aa:bb:cc:dd:ee:02" corresponding to segment S3. The detecting apparatus 100 stores a source MAC address "aa:bb:cc:dd:ee:03" corresponding to segment S3.

(3) The detecting apparatus 100 detects a faulty segment based on the source MAC addresses related to the packet loss according to (1) above and the groups of source MAC addresses associated with segments S1 to S3 stored in (2) above.

In FIG. 9, it is assumed that a quality analyzing packet including a source MAC address "aa:bb:cc:dd:ee:01" is lost. The source MAC address "aa:bb:cc:dd:ee:01" matches the group associated with segment S3. Therefore, the detecting apparatus 100 detects segment S3 as a faulty segment.

A faulty-segment detection process when a failure occurs in segment S2 is similar to that explained with FIG. 1 and thus the explanation thereof is omitted. In this way, the detecting apparatus 100 can identify a faulty segment.

Figure 10:
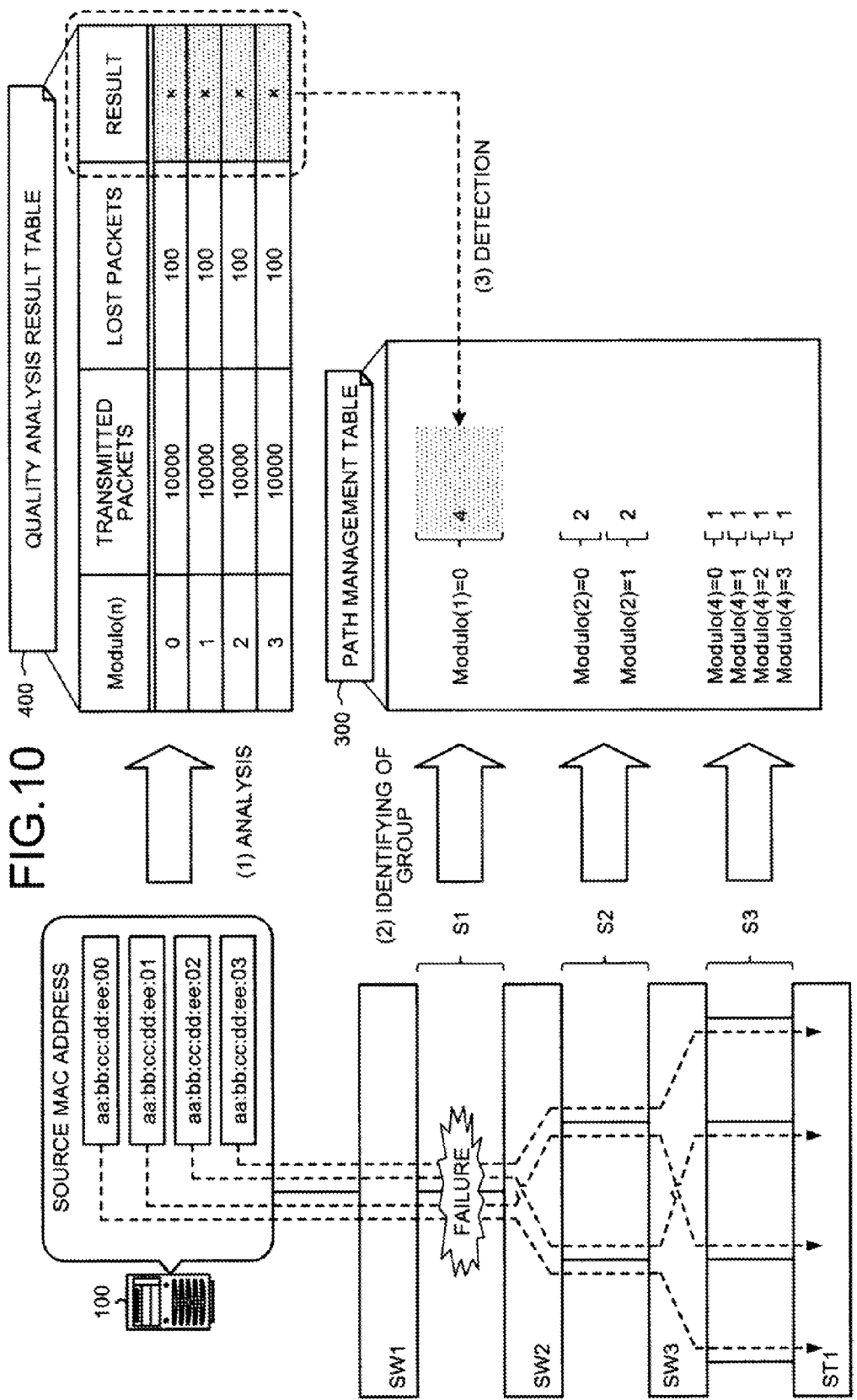
FIG. 10 is a diagram depicting a second example of the faulty-segment detection process.

With reference to FIG. 10, a second example of a faulty-segment detection process performed by the detecting apparatus 100 is explained. In the first example, a faulty segment is detected based on the combination of source MAC addresses related to the packet loss. In the second example, a faulty segment is detected based on the number of source MAC addresses related to the packet loss as depicted in FIG. 5.

FIG. 10 is a diagram depicting the second example of the faulty-segment detection process. Explanation of parts identical to FIG. 1 is omitted. Here, it is assumed that a failure occurs in segment S1.

(1) The detecting apparatus 100 finds the maximal number of links over segments S1 to S3. The detecting apparatus 100 determines the number of source MAC addresses included in a quality analyzing packet so that a quality analyzing packet is sent to each link of segment S3 which has the maximum number of links.

In FIG. 10, the detecting apparatus 100 determines "aa:bb:cc:dd:ee:00" to "aa:bb:cc:dd:ee:03" as four source MAC addresses whose last bits give Modulo (4), 0 to 3. The detecting apparatus 100 generates, for example, quality analyzing packets each of which includes one of "aa:bb:cc:dd:ee:00" to "aa:bb:cc:dd:ee:03".

The detecting apparatus 100 transmits the quality analyzing packets to the storage apparatus ST1. The detecting apparatus 100 waits for a response from the storage apparatus ST1 and when the response is not received within a given time period, counts lost packets and stores a result in the quality analysis result table 400.

In this way, the detecting apparatus 100 can determine which source MAC address is related to the packet loss. The detecting apparatus 100 can identify the number of the source MAC addresses related to the packet loss.

(2) The detecting apparatus 100 divides source MAC addresses into groups based on the first sorting rule and the number of links in the segments S1 to S3 and identifies the number of source MAC addresses in each group. The detecting apparatus 100 establishes an identifiers column instead of the identifier group column in the path management table 300 and stores the number associated with the segments in the path management table 300.

As in FIG. 1, quality analyzing packets including four source MAC addresses "aa:bb:cc:dd:ee:00" to "aa:bb:cc:dd:ee:03" respectively is sent to links in segment S1. The detecting apparatus 100 stores "4", the number of source MAC addresses, associated with segment S1.

According to the first sorting rule, one link in segment S2 receives packets including two source MAC addresses "aa:bb:cc:dd:ee:00" to "aa:bb:cc:dd:ee:02" respectively. The other link in segment S2 receives packets including two source MAC addresses "aa:bb:cc:dd:ee:01" to "aa:bb:cc:dd:ee:03" respectively. Thus the detecting apparatus 100 stores "2", the number of source MAC addresses, associated with segment S2.

Links in segment S3 receive a quality analyzing packet including "aa:bb:cc:dd:ee:00", "aa:bb:cc:dd:ee:01", "aa:bb:cc:dd:ee:02", or "aa:bb:cc:dd:ee:03". The detecting apparatus 100 stores "1", the number of source MAC addresses, associated with segment S3.

(3) The detecting apparatus 100 detects a faulty segment based on the presence of a packet loss according to (1) above and the number of source MAC addresses stored in (2) above.

The detecting apparatus 100 identifies the number of source MAC addresses related to the packet loss based on the quality analysis result table 400. The detecting apparatus 100 identifies a segment that is associated with the number identical to the number of source MAC addresses related to the packet loss.

In FIG. 10, the quality analyzing packet including "aa:bb:cc:dd:ee:00" to "aa:bb:cc:dd:ee:03" is lost. The number of source MAC addresses of the lost packet is four. Therefore, the detecting apparatus 100 detects segment S1 as a faulty segment since segment S1 is associated with the number "4". In this way, the detecting apparatus 100 can detect a faulty segment from among segments S1 to S3.

In the examples 1 and 2 above, the number of links in the segments are expressed by the power of 2 but the embodiments are not limited to this example. Further, in the examples above, the number of links monotonically increases towards the storage apparatus ST1 but the embodiments are not limited to this example. For example, segments may have three or five links or the number of links may decrease towards the storage apparatus ST1.

Figure 11:
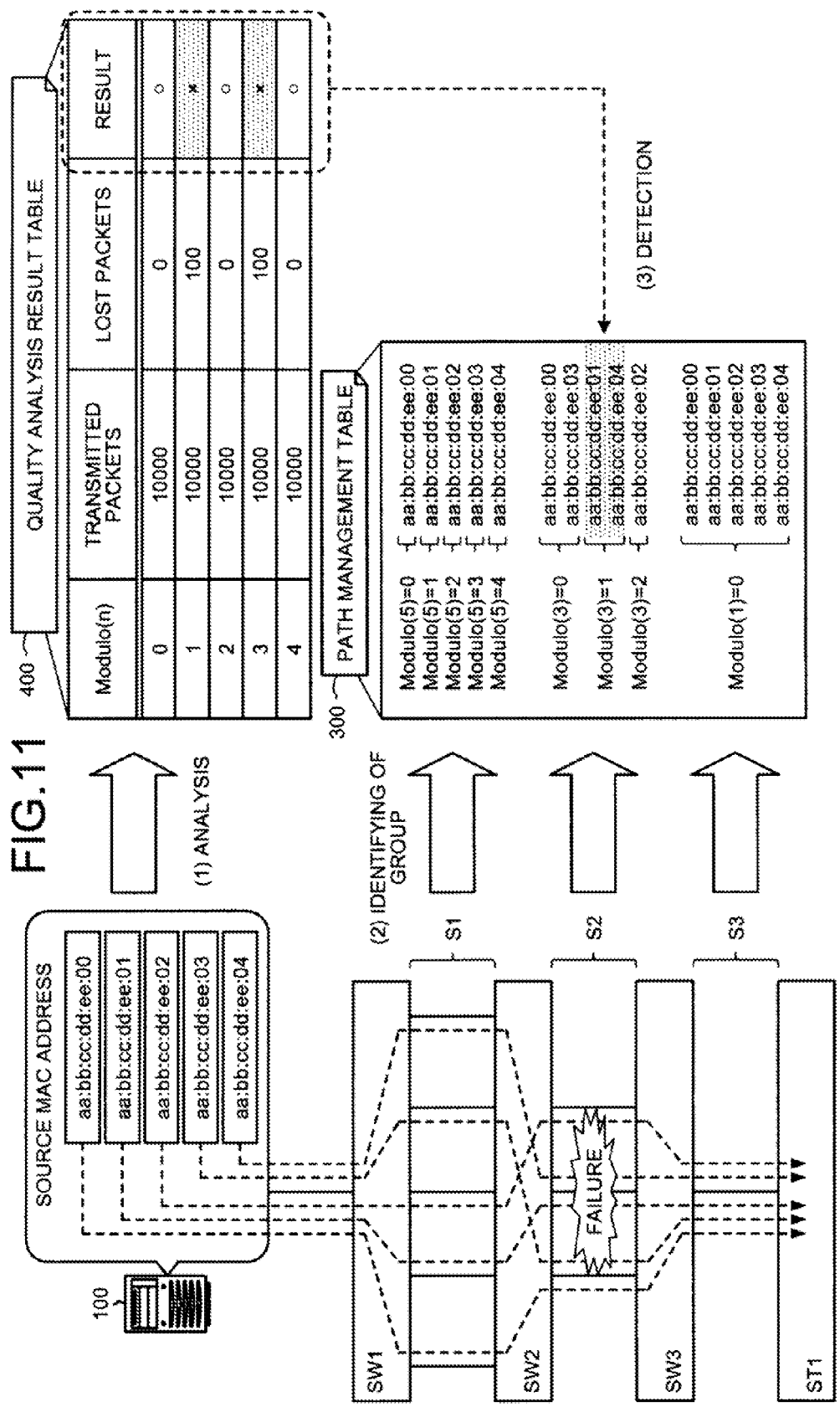
FIG. 11 is a diagram depicting a third example of the faulty-segment detection process.

With reference to FIG. 11, a third example of a faulty-segment detection process is explained. In this example, segments have five, three, and one link and the number of links reduces towards the storage apparatus ST1.

FIG. 11 is a diagram depicting a third example of a faulty-segment detection process. The explanation of parts identical to FIG. 1 is omitted. In FIG. 11, a failure occurs in segment S2.

(1) The detecting apparatus 100 transmits quality analyzing packets when receiving a boot notification from the monitoring apparatus 200.

The detecting apparatus 100 acquires the number of links of segments on a path. The number of links in segments S1 to S3 is acquired from the switches. The boot notification may include the number of links in segments S1 to S3.

The detecting apparatus 100 identifies the maximal number of links. In FIG. 11, the maximal number of links is five, the number of links in segment S1. The detecting apparatus 100 selects source MAC addresses to be included in quality analyzing packets so that the quality analyzing packets are sent to each link in segment S1.

The detecting apparatus 100 selects five source MAC addresses so that the tail bits of the addresses ranges between 0 to 4, Modulo (5). In FIG. 11, source MAC addresses "aa:bb:cc:dd:ee:00" to "aa:bb:cc:dd:ee:04" are selected.

The detecting apparatus 100 generates quality analyzing packets including one of the five source MAC addresses. Any one of the five source MAC addresses is present at least in one packet.

The detecting apparatus 100 transmits the quality analyzing packets to the storage apparatus ST1. The detecting apparatus 100 sends the quality analyzing packets including "aa:bb:cc:dd:ee:00" to "aa:bb:cc:dd:ee:04" to the storage apparatus ST1.

The detecting apparatus 100 determines whether a packet is lost. The detecting apparatus 100 waits for a response to the quality analyzing packets from the storage apparatus ST1 and counts lost packets and stores the result in the quality analysis result table 400 when the response is not received within a given time period.

In this way, the detecting apparatus 100 can determine which source MAC address is related to the packet loss. The detecting apparatus 100 can also determine the combination of source MAC addresses related to the packet loss.

(2) The detecting apparatus 100 divides source MAC addresses into groups based on the first sorting rule and the number of links in the segments. The detecting apparatus 100 identifies a group of source MAC addresses sent to each link. The detecting apparatus 100 stores the groups associated with the segments in the path management table 300.

In FIG. 11, links in segment S1 receive a quality analyzing packet including "aa:bb:cc:dd:ee:00", "aa:bb:cc:dd:ee:01", "aa:bb:cc:dd:ee:02", "aa:bb:cc:dd:ee:03", or "aa:bb:cc:dd:ee:04".

The detecting apparatus 100 stores five groups of "aa:bb:cc:dd:ee:00", "aa:bb:cc:dd:ee:01", "aa:bb:cc:dd:ee:02", "aa:bb:cc:dd:ee:03", or "aa:bb:cc:dd:ee:04" associated with segment S1.

One link in segment S2 receives a quality analyzing packet including "aa:bb:cc:dd:ee:00" and one including "aa:bb:cc:dd:ee:03". Another link in segment S2 receives a quality analyzing packet including "aa:bb:cc:dd:ee:01" and one including "aa:bb:cc:dd:ee:04". The last link in segment S2 receives a quality analyzing packet including "aa:bb:cc:dd:ee:02".

Thus, the detecting apparatus 100 stores a group of "aa:bb:cc:dd:ee:00" and "aa:bb:cc:dd:ee:03", a group of "aa:bb:cc:dd:ee:01" and "aa:bb:cc:dd:ee:04", and a group of "aa:bb:cc:dd:ee:02", each associated with segment S2.

A link in segment S3 receives a quality analyzing packet including "aa:bb:cc:dd:ee:00" to "aa:bb:cc:dd:ee:04". Thus, the detecting apparatus 100 stores a group of "aa:bb:cc:dd:ee:00" to "aa:bb:cc:dd:ee:04" associated with segment S3.

(3) The detecting apparatus 100 detects a faulty segment based on the presence of the packet loss according to (1) above and the groups of source MAC addresses associated with segments S1 to S3 in (2) above.

For example, a combination of source MAC addresses related to the packet loss is identified from the quality analysis result table 400. The detecting apparatus 100 searches the groups of source MAC addresses for a group that matches the identified combination of source MAC addresses. The detecting apparatus 100 detects, as a faulty segment, one that is associated with the group retrieved.

In FIG. 11, the combination of "aa:bb:cc:dd:ee:01" and "aa:bb:cc:dd:ee:04" matches a group associated with segment S2. Thus, the detecting apparatus 100 detects segment S2 as a faulty segment. In this way, the detecting apparatus 100 can detect a faulty segment.

Figure 12:
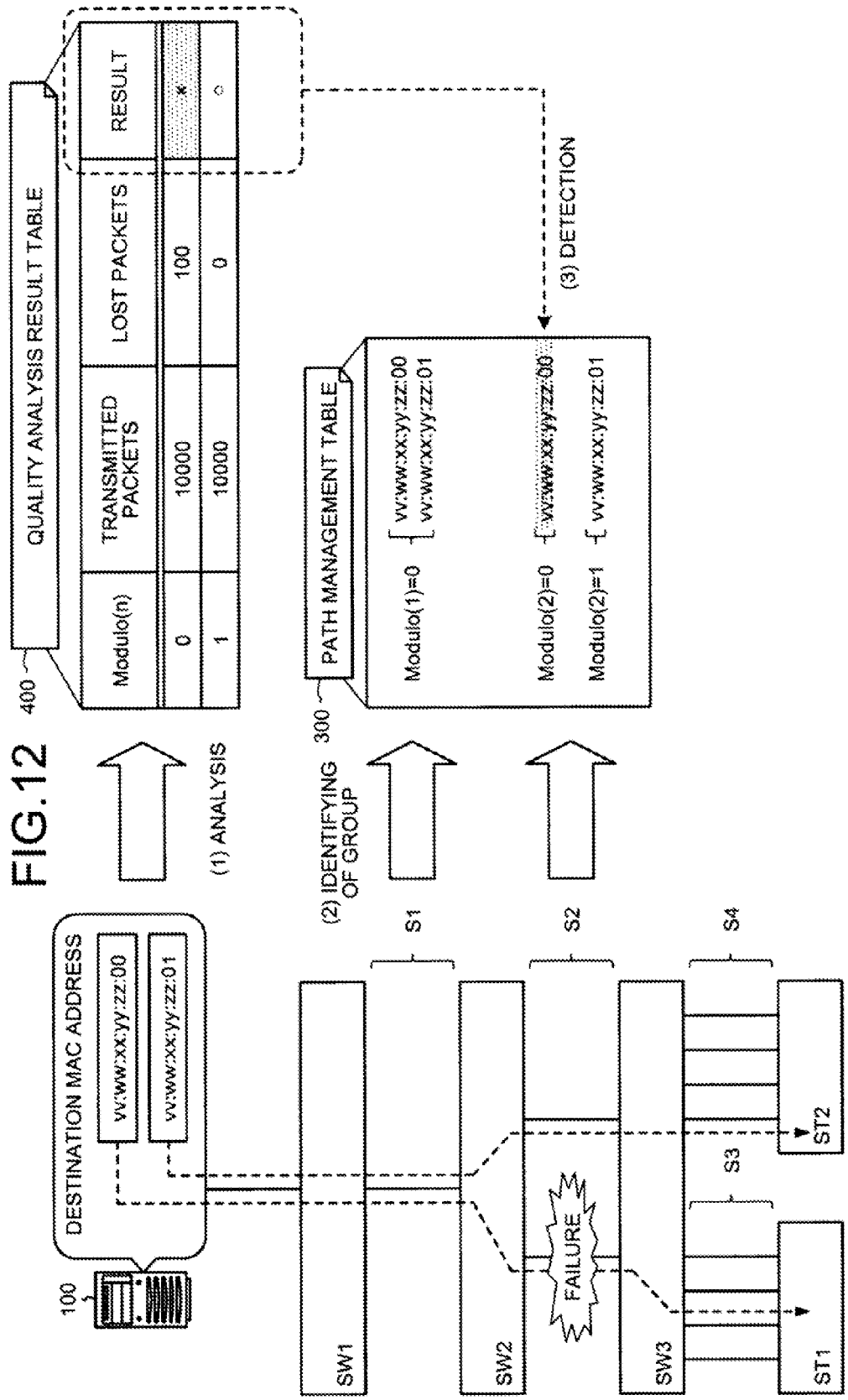
FIG. 12 is a diagram depicting a fourth example of the faulty-segment detection process.
Figure 13:
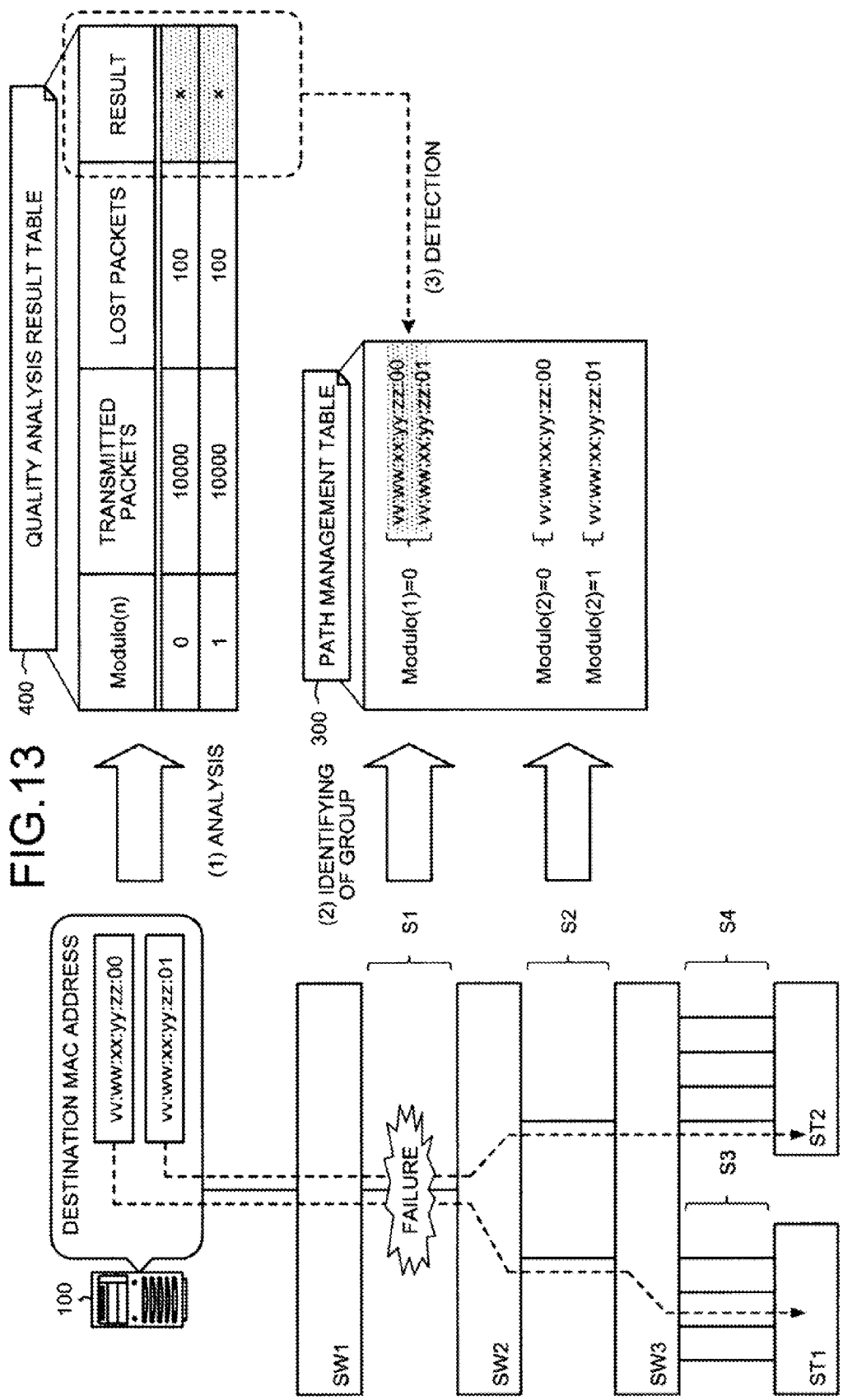
FIG. 13 is a diagram depicting the fourth example of the faulty-segment detection process.

With reference to FIG. 12 and FIG. 13, a fourth example of a faulty-segment detection process is explained. In the first to third examples, source MAC addresses are used to find a faulty segment. In the fourth example, destination MAC addresses are used. In this case, a faulty segment can be found when switches SW1 to SW3 adopt the second sorting rule.

FIG. 12 and FIG. 13 are diagrams depicting the fourth example of a faulty-segment detection process. Explanation of parts identical to FIG. 1 is omitted.

The network 210 in FIG. 12 and FIG. 13 includes the detecting apparatus 100, the monitoring apparatus 200, the switches SW1, SW2, SW3, the storage apparatus ST1, and a storage apparatus ST2. Segment S4 between the switch SW3 and the storage apparatus ST2 includes four links.

A MAC address of the storage apparatus ST1 is "vv:ww:xx:yy:zz:00". A MAC address of the storage apparatus ST2 is "vv:ww:xx:yy:zz:01". In FIG. 12 and FIG. 13, a path to be checked is one that includes segments S1 and S2.

With reference to FIG. 12, a faulty-segment detection process for a failure in segment S2 is explained.

(1) The detecting apparatus 100 transmits quality analyzing packets after receiving a boot notification from the monitoring apparatus 200 and checks segments S1, S2.

The detecting apparatus 100 acquires the number of links in segments S1, S2. The number of links may be acquired from the switches. The boot notification may include information on the number of links.

The detecting apparatus 100 acquires the maximal number of links. In FIG. 12, the detecting apparatus 100 acquires "2", the number of links in segment S2. The detecting apparatus 100 selects a destination MAC address so that quality analyzing packets are sent to every link in segment S2 under the second sorting rule.

In this case, the maximal number of links is two and thus the detecting apparatus 100 selects two destination MAC addresses so that the tail bits of the addresses are 0 or 1, Modulo (2). In FIG. 12, the detecting apparatus 100 selects "vv:ww:xx:yy:zz:00" and "vv:ww:xx:yy:zz:01".

The detecting apparatus 100 generates quality analyzing packets so that each of the two destination MAC addresses is included in at least one of the quality analyzing packets. The detecting apparatus 100 generates, for example, a quality analyzing packet including "vv:ww:xx:yy:zz:00" and one including "vv:ww:xx:yy:zz:01". The detecting apparatus 100 sends the quality analyzing packets to the storage apparatuses ST1 and ST2.

The detecting apparatus 100 waits for a response to the quality analyzing packets. The detecting apparatus 100 waits for a response from the storage apparatuses ST1 and ST2, and when the response is not received within a given time period, counts lost packets and stores the result in the quality analysis result table 400.

In this way, the detecting apparatus 100 can detect which destination MAC address is lost and find the combination of destination MAC addresses related to the packet loss.

(2) The detecting apparatus 100 divides destination MAC addresses to groups based on the second sorting rule and the number of links in segments S1, S2. The detecting apparatus 100 identifies a group of destination MAC address sent to each link. The detecting apparatus 100 stores the groups associated with the segments in the path management table 300.

In FIG. 12, one link in segment S1 receives a quality analyzing packet including "vv:ww:xx:yy:zz:00" and a quality analyzing packet including "vv:ww:xx:yy:zz:01". The detecting apparatus 100 stores a group of "vv:ww:xx:yy:zz:00" and "vv:ww:xx:yy:zz:01" associated with segment S1.

One link in segment S2 receives a quality analyzing packet including "vv:ww:xx:yy:zz:00". The other link receives "vv:ww:xx:yy:zz:01." Thus, the detecting apparatus 100 stores group of "vv:ww:xx:yy:zz:00" and "vv:ww:xx:yy:zz:01" associated with segment S2.

The detecting apparatus 100 detects a faulty segment based on the presence of packet loss according (1) above and the groups of destination MAC addresses stored in (2) above.

The detecting apparatus 100 identifies the combination of destination MAC addresses related to the packet loss based on the quality analysis result table 400. The detecting apparatus 100 identifies a group that matches the combination of destination MAC addresses related to the packet loss. The detecting apparatus 100 detects, as a faulty segment, a segment associated with the group.

In FIG. 12, a response to a quality analyzing packet including "vv:ww:xx:yy:zz:00" is missing. The destination MAC address "vv:ww:xx:yy:zz:00" matches the group associated with segment S2. Thus, the detecting apparatus 100 detects segment S2 as a faulty segment. In this way, the detecting apparatus 100 can determine which segment is a faulty segment.

With reference to FIG. 13, a faulty-segment detection process for a failure in segment S1 is explained.

(1) The detecting apparatus 100 transmits quality analyzing packets when receiving a boot notification from the monitoring apparatus 200.

The detecting apparatus 100 selects two destination MAC addresses "vv:ww:xx:yy:zz:00" and "vv:ww:xx:yy:zz:01" so that the tail bits of the addresses are 0 or 1, Modulo (2). The detecting apparatus 100 generates a quality analyzing packet including "vv:ww:xx:yy:zz:00" and one including "vv:ww:xx:yy:zz:01". The detecting apparatus 100 transmits the quality analyzing packets to the storage apparatuses ST1 and ST2.

The detecting apparatus 100 waits for responses from the storage apparatuses ST1 and ST2 and when a response is not received within a given time, counts a lost packet and stores the result in the quality analysis result table 400.

In this way, the detecting apparatus 100 can determine which destination MAC address is included in a lost packet.

The detecting apparatus 100 identifies the combination of destination MAC addresses related to the packet loss.

(2) The detecting apparatus 100 divides destination MAC addresses into groups based on the second sorting rule and the number of links in segments S1 and S2. The detecting apparatus 100 stores in the path management table 300 the groups associated with the segments.

In FIG. 13, the detecting apparatus 100 stores a group of "vv:ww:xx:yy:zz:00" and "vv:ww:xx:yy:zz:01" associated with segment S1. The detecting apparatus 100 stores a group of "vv:ww:xx:yy:zz:00" associated with segment S2 and a group of "vv:ww:xx:yy:zz:01" associated with segment S2.

(3) The detecting apparatus 100 detects a faulty segment based on the destination MAC addresses related to the packet loss identified in (1) above and the groups of destination MAC addresses associated with segments S1 and S2 in (2) above.

In FIG. 13, a quality analyzing packet including "vv:ww:xx:yy:zz:00" and "vv:ww:xx:yy:zz:01" is lost. The combination of "vv:ww:xx:yy:zz:00" and "vv:ww:xx:yy:zz:01" matches a group associated with segment S1. Thus, the detecting apparatus 100 detects segment S1 as a faulty segment. In this way, the detecting apparatus 100 can find a faulty segment.

Figure 14:
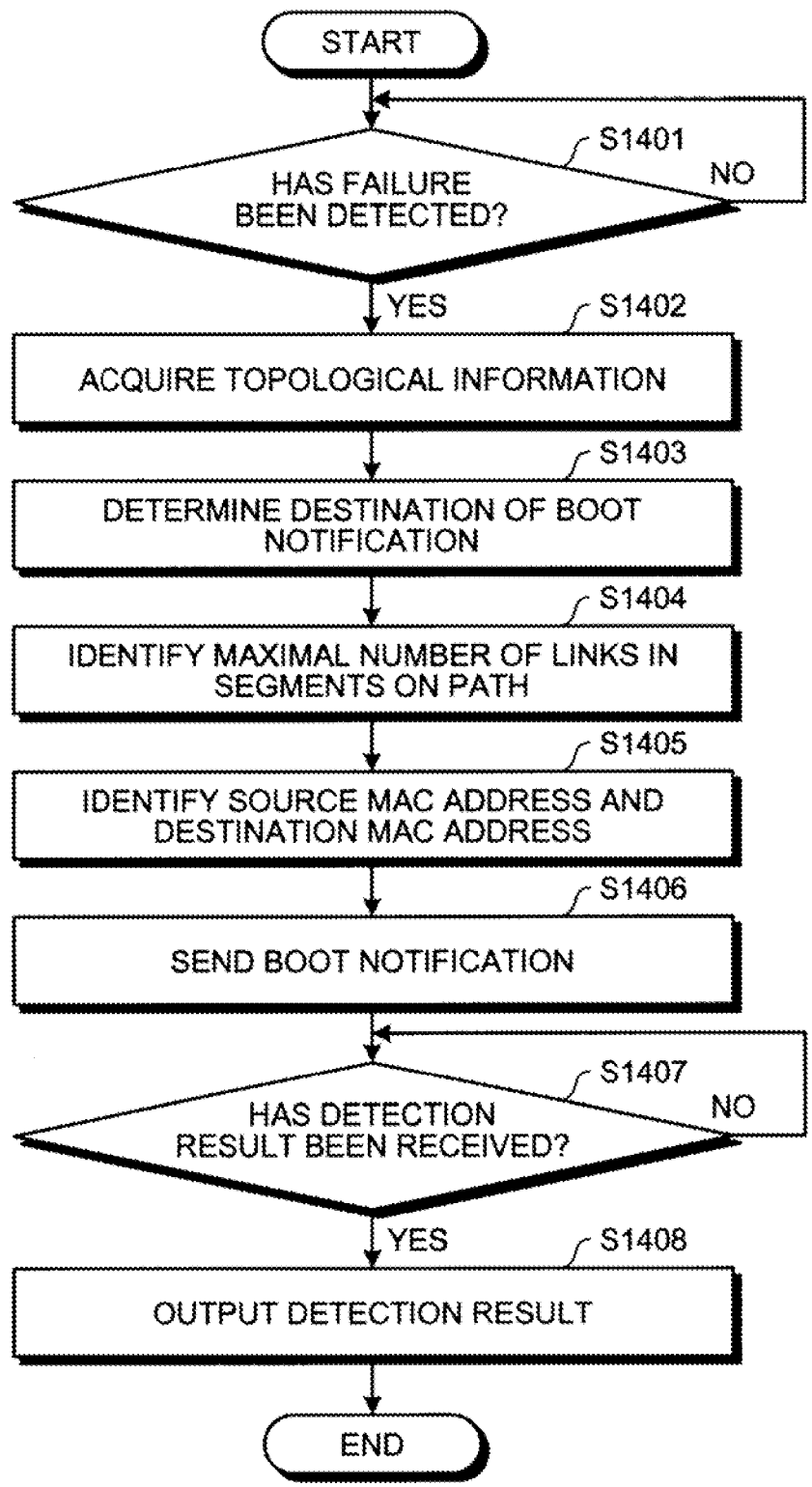
FIG. 14 is a flowchart depicting a detecting apparatus boot process performed by the monitoring apparatus 200.

With reference to FIG. 14, a detecting apparatus boot process performed by the monitoring apparatus 200 is explained. The detecting apparatus boot process in FIG. 14 corresponds to the detecting apparatus boot process in FIG. 7.

FIG. 14 is a flowchart depicting a detecting apparatus boot process. The monitoring apparatus 200 determines whether a failure in a network is detected (step S1401). If a failure is not detected (step S1401: NO), the process returns to step S1401 and the monitoring apparatus 200 keeps monitoring the network.

If a failure is detected (step S1401: YES9, the monitoring apparatus 200 acquires topological information from switches in the network 210 (step S1402). The monitoring apparatus 200 determines a destination of a boot notification for the detecting apparatus 100 (step S1403).

The monitoring apparatus 200 identifies the maximal number of links in each segment on the path (step S1404). The monitoring apparatus 200 selects destination MAC addresses and source MAC addresses based on the maximal number of links (step S1405).

The monitoring apparatus 200 sends the boot notification to the destination (step S1406). The boot notification includes the maximal number of links, destination MAC addresses, and source MAC addresses.

The monitoring apparatus 200 determines whether a detection result is received (step S1407). If the detection result is not yet received (step S1407: NO), the process returns to step S1407 and the monitoring apparatus 200 waits for the detection result.

If the detection result is received (step S1407: YES), the monitoring apparatus 200 outputs the detection result (step S1408) and the process ends. In this way, the monitoring apparatus 200 can give a trigger for the faulty-segment detection process to the detecting apparatus 100. The monitoring apparatus 200 can send topological information to the detecting apparatus 100.

As a result, the monitoring apparatus 200 can notify the faulty segment to the user (for example, the network administrator) of the monitoring apparatus 200. The administrator of the network 210 can inspect and manage the network 210 based on the faulty segment. The administrator can skip segments operating as usual and shorten the time for the inspection and management of the network 210.

Figure 15:
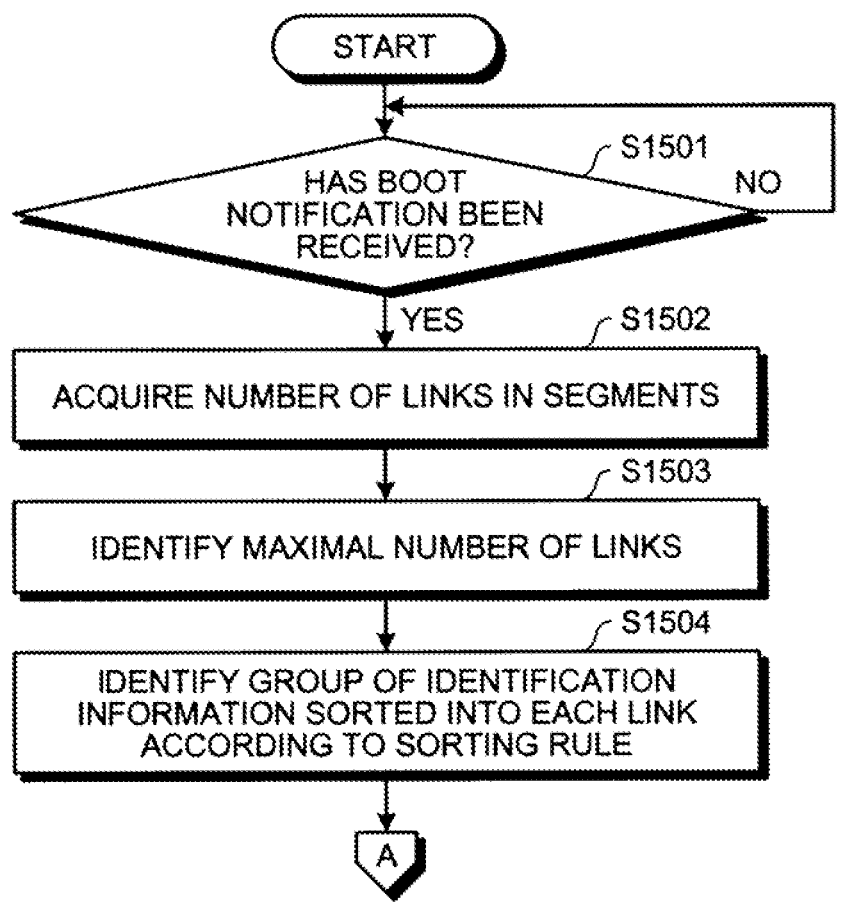
FIG. 15 is a flowchart depicting a faulty-segment detection process performed by the detecting apparatus 100.
Figure 16:
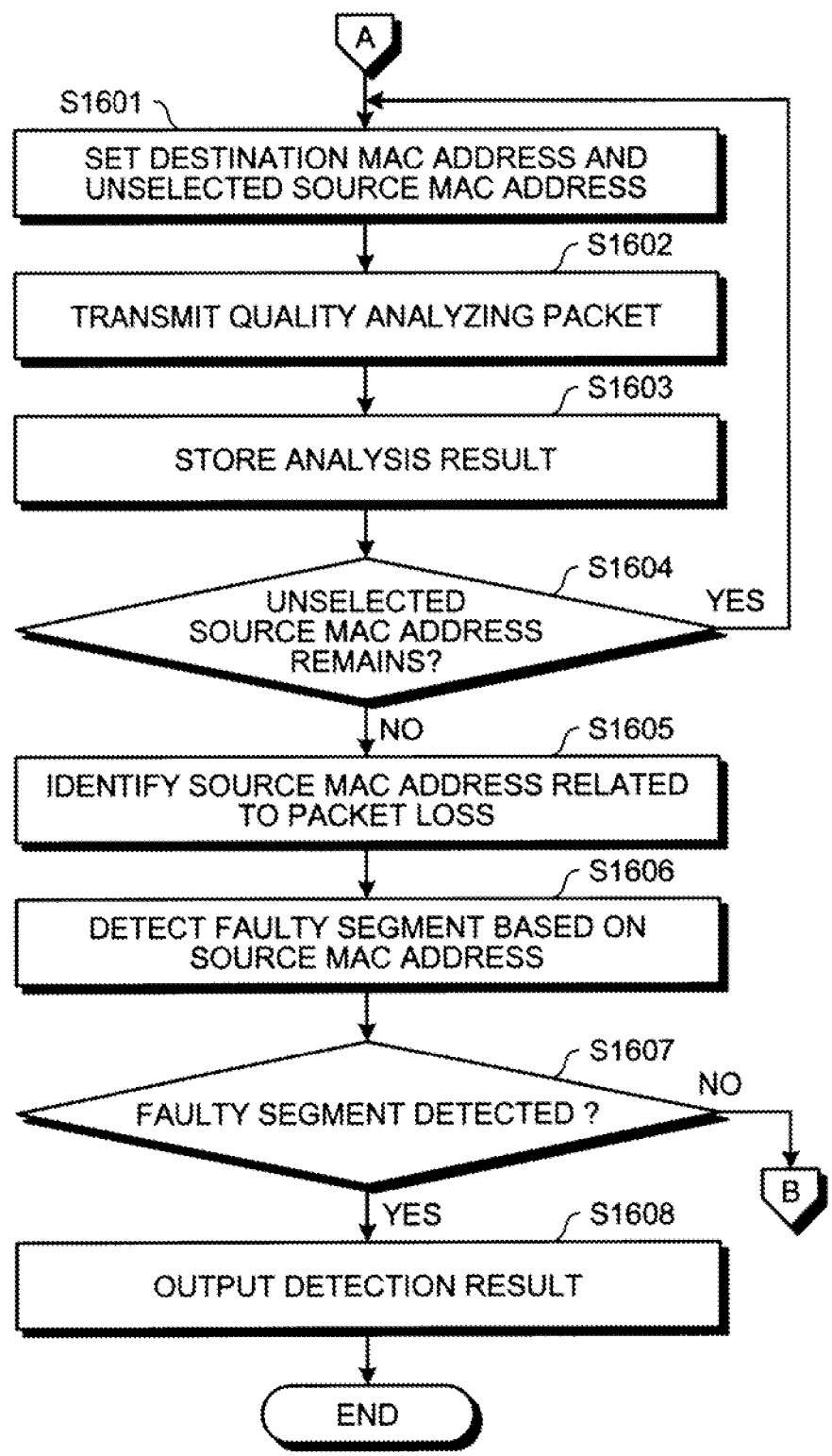
FIG. 16 is a flowchart depicting the faulty-segment detection process performed by the detecting apparatus 100.

With reference to FIG. 15 to FIG. 17, a faulty-segment detection process is explained. The faulty-segment detection process of FIG. 15 to FIG. 17 includes that of FIG. 8 and FIG. 9 and that of FIG. 12 and FIG. 13.

According to the faulty-segment detection process of FIG. 15 to FIG. 17, the detecting apparatus 100 executes the process of FIG. 8 and FIG. 9 and when a faulty segment is not detected, executes the process of FIG. 12 and FIG. 13.

FIG. 15 to FIG. 17 are flowcharts depicting a faulty-segment detection process performed by the detecting apparatus 100. In FIG. 15, the detecting apparatus 100 determines whether a boot notification is received (step S1501). If the boot notification is not received (step S1501: NO), the detecting apparatus 100 waits for a boot notification.

If the boot notification is received (step S1501: YES), the detecting apparatus 100 acquires the number of links in segments on the path (step S1502). The detecting apparatus 100 identifies the maximal number of links on the path (step S1503).

The detecting apparatus 100 sets groups of identification information (step S1504). The identification information is a source MAC address and a destination MAC address. The process goes to step S1601 in FIG. 16.

In FIG. 16, the detecting apparatus 100 selects a destination MAC address and a source MAC address from among destination MAC addresses and source MAC addresses included in the boot notification and sets the addresses in the detecting apparatus 100 (step S1601). The detecting apparatus 100 transmits a quality analyzing packet including the destination MAC address and the source MAC address (step S1602). The detecting apparatus 100 stores a result of the quality analysis in the quality analysis result table 400 (step S1603).

The detecting apparatus 100 determines whether there is an unselected source MAC address (step S1604). If there is an unselected source MAC address (step S1604: YES), the process returns to step S1601.

If there is no unselected source MAC address (step S1604: NO), the detecting apparatus 100 refers to the quality analysis result table 400 and identifies the combination of source MAC addresses related to the packet loss (step S1605). The detecting apparatus 100 detects a faulty segment based on the groups of identification information set at step S1504 and the combination of source MAC addresses identified at step S1605 (step S1606).

The detecting apparatus 100 determines whether a faulty segment is detected (step S1607). If a faulty segment is detected (step S1607: YES), the detecting apparatus 100 output the faulty segment (step S1608) and the process ends. If a faulty segment is not detected (step S1607: NO), the process goes to step S1701 in FIG. 17.

In FIG. 17, the detecting apparatus 100 selects a destination MAC address and a source MAC address from among destination MAC addresses and source MAC addresses included in the boot notification and sets the addresses in the detecting apparatus 100 (step S1701). The detecting apparatus 100 transmits a quality analyzing packet including the destination MAC address and the source MAC address (step S1702). The detecting apparatus 100 stores a result of the quality analysis in the quality analysis result table 400 (step S1703).

The detecting apparatus 100 determines whether there is an unselected destination MAC address (step S1704). If there is an unselected destination MAC address (step S1704: YES), the process returns to step S1701.

If there is no unselected destination MAC address (step S1704: NO), the detecting apparatus 100 refers to the quality analysis result table 400 and identifies the combination of destination MAC addresses related to the packet loss (step S1705). The detecting apparatus 100 detects a faulty segment based on the groups of identification information set at step S1504 and the combination of the destination MAC addresses identified at step S1705 (step S1706).

The detecting apparatus 100 determines whether a faulty segment is detected (step S1707). If a faulty segment is detected (step S1707: YES), the detecting apparatus 100 outputs the faulty segment (step S1708) and the process ends.

If a faulty segment is not detected (step S1707: NO), the detecting apparatus 100 outputs a result informing the unsuccessful detection (step S1709) and the process ends. In this way, the detecting apparatus 100 can detect a faulty segment.

As explained above, the detecting apparatus 100 transmits a quality analyzing packets including multiple kinds of identification information and monitors whether the packet loss occurs. When a failure occurs in some segment, the detecting apparatus 100 finds a group of identification information related to the packet loss. The detecting apparatus 100 detects and outputs the segment associated with the group of identification information as a faulty segment.

In this way, the detecting apparatus 100 can detect and output a faulty segment. The detecting apparatus 100 may output information on the faulty segment to the display or transmit the information on the faulty segment to the monitoring apparatus 200. As a result, the a user of detecting apparatus 100 or an administrator of the network 210 who can be a user of the monitoring apparatus 200 can inspect and manage the network 210 with reference to the faulty segment. The administrator of the network 210 can skip correctly operating links and reduce the time for the inspection and management of the network 210.

The detecting apparatus 100 adopts as identification information a value in a source address, a value in a destination address, or a value in exclusive OR of a source address and a destination address. In this way, the detecting apparatus 100 adopts identification information corresponding to each of the first to third sorting rules and detects a faulty segment.

When faulty segment is not detected, the detecting apparatus 100 monitors a path in the use of an unselected value. In this way, the detecting apparatus 100 can find a faulty segment using all types of identification information corresponding to the first to third sorting rules even when sorting rules adopted by the switches on the path is unknown.

According to the conventional network tomography technique, multiple paths that are judged as a faulty path are superimposed and a faulty segment is detected. Thus, it cannot be determined which segment on the path is faulty segment when the path includes multiple segments. On the other hand, the detecting apparatus 100 according to the above embodiments can identify a faulty segment on the path.

The network tomography technique requires that a path of a packet be known with a routing protocol. Thus, the technique cannot be applied to a network that includes a layer 2 switch which is not designed to operate according to a routing protocol. On the other hand, the detecting apparatus 100 according to the above embodiments can detect a faulty segment without a routing protocol and can be applied to a network that includes a layer 2 switch.

There has been a way to monitor the traffic on a switch by a computer. More specifically, according to a conventional method, a computer collects a value of a counter of the MIB concerning lost packets from every interface of switches and detects a faulty segment.

However, the computer constantly collects the MIB since the counter of the MIB must compute the difference. As a result, failing to collect the MIB means the missing of a failure in a link.

On the other hand, the detecting apparatus 100 according to the above embodiments need not constantly collect the MIB. The MIB is collected only when topological information of the network 210 is acquired. Therefore, the detecting apparatus 100 can reduce the time for collecting the MIB and prevent a communication path from being crowded due to the collection of the MIB.

The detection method and the generation method in the present embodiments can be implemented by a computer, such as a personal computer and a workstation, executing a program that is prepared in advance. The program is recorded on a computer-readable recording medium such as a hard disk, a flexible disk, a CD-ROM, an MO, a DVD, and is executed by being read out from the recording medium by a computer. The program can be distributed through a network such as the Internet.

According to one aspect of the embodiments, the accuracy in the detection of a faulty segment in a network is improved.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A detecting apparatus for detecting a failure that has occurred in a communication system that includes a plurality of switches each of which switches, among a plurality of output ports, an output port through which a packet is output according to a given identifier included in the packet and a given condition, the detecting apparatus comprising:
   a storing unit that stores, for each section between adjacent two switches, a plurality of groups of identifiers that is associated with the section, wherein the identifiers included in packets are classified into the groups according to the given condition defined for each section;
   a transmitting unit that transmits a plurality of packets created such that each output port of each section of the communication system causes at least one packet to pass through the output port; and
   a determining unit that determines, when identifiers included in packets for which no response is received among the packets transmitted by the transmitting unit, are identical to the identifiers of one of the groups associated with a given section, that a failure has occurred in the given section.

2. The detecting apparatus according to claim 1, wherein
   the storing unit stores, for each section between the adjacent two switches, a plurality of numbers each of which indicates the number of identifiers of one of the groups, and
   the determining unit determines, when the number of identifiers included in the packets for which no response is received among the packets transmitted by the transmitting unit, is identical to one of the numbers associated with a given section, that the failure has occurred in the given section.

3. The detecting apparatus according to claim 1, further comprising:
   an output unit that outputs the given section where the failure occurs.

4. The detecting apparatus according to claim 1, wherein the identifiers are addresses from which the packets are sent.

5. The detecting apparatus according to claim 1, wherein the identifiers are addresses to which the packets are sent.

6. A generating apparatus comprising:
   a sensing unit that senses a failure in a network that includes a plurality of switches each of which switches, among a plurality of output ports, an output port through which a packet is output according to a given identifier included in the packet and a given condition;
   a creating unit that creates, upon detection of the failure, a set of identifiers such that each output port of each section of the communication system causes at least one packet that includes one of the identifiers to pass through the output port; and
   a transmitting unit that transmits the set of identifiers to the computer.

7. The generating apparatus according to claim 6, wherein the identifiers are addresses from which packets are sent.

8. The generating apparatus according to claim 6, wherein the identifiers are addresses to which packets are sent.

* * * * *